(12) United States Patent
Tang et al.

(10) Patent No.: US 12,298,024 B2
(45) Date of Patent: May 13, 2025

(54) MULTI-MODE COOLING APPARATUS

(71) Applicant: ST ENGINEERING INNOSPARKS PTE LTD, Singapore (SG)

(72) Inventors: Ee Ho Gareth Tang, Singapore (SG); Fuyun Li, Singapore (SG); Tze Wei Timothy Ang, Singapore (SG); Lok Lee Hillary Yap, Singapore (SG)

(73) Assignee: ST ENGINEERING INNOSPARKS PTE LTD, Singapore (SG)

( * ) Notice: Subject to any disclaimer, the term of this patent is extended or adjusted under 35 U.S.C. 154(b) by 202 days.

(21) Appl. No.: 18/014,904

(22) PCT Filed: Jul. 7, 2020

(86) PCT No.: PCT/SG2020/050383
§ 371 (c)(1),
(2) Date: Jan. 6, 2023

(87) PCT Pub. No.: WO2022/010414
PCT Pub. Date: Jan. 13, 2022

(65) Prior Publication Data
US 2023/0258360 A1     Aug. 17, 2023

(51) Int. Cl.
- *F25B 29/00* (2006.01)
- *F24F 5/00* (2006.01)
- *F24F 11/83* (2018.01)
- *F24F 110/10* (2018.01)
- *F24F 110/20* (2018.01)

(52) U.S. Cl.
CPC ............ *F24F 11/83* (2018.01); *F24F 5/0035* (2013.01); *F24F 2110/10* (2018.01); *F24F 2110/20* (2018.01)

(58) Field of Classification Search
CPC ...... F24F 11/83; F24F 5/0035; F24F 2110/20; F24F 2110/10
USPC ....................................................... 165/201
See application file for complete search history.

(56) References Cited

U.S. PATENT DOCUMENTS

| | | |
|---|---|---|
| 3,116,612 A | 1/1964 | Pennington |
| 4,361,525 A | 11/1982 | Leyland |
| 2016/0102919 A1 | 4/2016 | Kinkel |

(Continued)

FOREIGN PATENT DOCUMENTS

| | | |
|---|---|---|
| WO | 2017138889 A1 | 8/2017 |
| WO | 2018012970 A1 | 1/2018 |
| WO | 2018021967 A1 | 2/2018 |

OTHER PUBLICATIONS

International Preliminary Report on Patentability for corresponding application PCT/SG2020/050383 filed Jul. 7, 2020; Mail date Oct. 5, 2020.

(Continued)

*Primary Examiner* — Davis D Hwu
(74) *Attorney, Agent, or Firm* — CANTOR COLBURN LLP

(57) ABSTRACT

The invention relates to a multi-component air conditioning apparatus that provides variable cooling capacities. The apparatus can include a main cooling unit and a heat rejection unit. Air can be treated both sensibly and adiabatically. By controlling the flow and volume of water, the apparatus can condition air to variable temperatures. This allows greater variability of capacity and temperature control.

24 Claims, 12 Drawing Sheets

(56) References Cited

U.S. PATENT DOCUMENTS

2020/0048875 A1\* 2/2020 Subramanian ............ E03B 3/28
2020/0375060 A1\* 11/2020 Lepoudre ........... H05K 7/20309

OTHER PUBLICATIONS

International Search Report for corresponding application PCT/SG2020/050383 filed Jul. 7, 2020; Mail date Oct. 5, 2020.
Written Opinion for corresponding application PCT/SG2020/050383 filed Jul. 7, 2020; Mail date Oct. 5, 2020.

\* cited by examiner

MULTI-MODE COOLING APPARATUS

FIELD OF THE INVENTION

The invention relates to a cooling apparatus, and more specifically, to a multi-mode cooling apparatus with variable cooling capacity and operational modes for conditioning air and water through controlling the flow and volume of water circulating in the apparatus.

BACKGROUND

Conventional air-cooling systems or air conditioners (AC's) utilize a complicated array of pipes with a condenser and compressor. A circulating refrigerant such as a chlorofluorocarbon (CFC) is forced into a compressor. Its subsequent release extracts heat from the surrounding air as it expands. These cooling systems consume high levels of energy and can be expensive to own and operate. Efforts have focused on alternative systems that are more environmentally friendly and cost effective.

The temperature of dry air can be lowered by utilizing the phase transition of liquid water to water vapor (i.e. evaporation). Evaporative cooling can be described as the addition of water vapor into air which lowers the temperature of the air. The energy needed to evaporate the water is taken from the air in the form of sensible heat and converted into latent heat while the enthalpy of the air remains constant. This conversion of sensible heat to latent heat is known as an adiabatic process because it occurs at a constant enthalpy. Evaporative cooling therefore causes a drop in the temperature of air proportional to the sensible heat drop and an increase in humidity proportional to the latent heat gain.

Basic evaporative cooling systems use a fan and an evaporative medium. A low pressure, high volume air mover is mounted in a housing that incorporates a large area of porous evaporation pads. Ambient air is circulated through the system where it is cooled and humidified. Because of their simple design, evaporative cooling systems can be more economical than vapor compression systems.

The cooling potential for evaporative cooling is dependent on the wet-bulb depression, the difference between dry-bulb temperature and wet-bulb temperature. Alternatives such as multi-stage evaporative coolers or dew point coolers can be used in attempt to overcome this limitation. For example, U.S. Patent Publication Number 2009/0031748 describes an evaporative cooling system that cools air to a temperature below that of the wet bulb temperature. It includes a reservoir of water that is chilled. The cooler water is purported to evaporate more slowly and assist in the overall efficiency of the system. A rotating disc sprays chilled water droplets upward to expose air to a fog-like curtain prior to exiting the chamber.

Similarly, Patent Application Number WO/2017/138889 describes a system for cooling an outdoor space comprising a main cooling module, a heat rejection module, a water management module and a control module. The main cooling module includes an indirect evaporative cooling unit for pre-cooling ambient air by reducing sensible heat and a direct evaporative cooling unit having a first evaporative medium for cooling the pre-cooled air (or direct ambient air) through vaporization of water to generate a conditioned supply air with a lower wet bulb temperature than the ambient air. A heat rejection module includes a second evaporative medium for removing heat contained in the water recycled from the indirect evaporative cooling unit thereby producing cool water having a temperature almost equivalent to the intake ambient air wet bulb temperature.

Patent Application Number WO/2018/012970 describes a two-stage evaporative cooling device has a single central chamber, divided into an upper chamber and a lower chamber by a divider that can be adjusted. One or more heat exchange units surround the central chamber with an upper fan arranged above the upper chamber and a lower fan arranged below the lower chamber with a single water circuit directing water flow. Each heat exchange unit comprised an evaporative cooling element and an air to water pre-cooler, the pre-cooler being placed ahead of a lower portion of the cooling element and the water circuit is arranged to irrigate the cooling element and collect the irrigated water below the cooling element for delivery to the pre-cooler. The water management system and circulation offers only limited modes of operation and variable cooling.

U.S. Pat. No. 4,361,525 describes an apparatus for efficiently and economically cooling air by sequentially passing the air to be cooled through a chilled water heat exchanger mechanism and then through an evaporative cooler mechanism. The apparatus is further provided with a chilled water exchange means for lowering the temperature of the incoming ambient air prior to its being evaporatively cooled in the above described manner. Water which is chilled by the evaporation principles as it passes downwardly through the wet pads of the cooler is contained and collected in the cooler's sump. This chilled water is re-circulated from the cooler's sump through the heat exchanger units and then delivered to the tops of the wettable cooler pads.

Patent Application Number WO/2018/021967A1 describes an apparatus with a single fluid storage device for holding a volume of coolant, a cooling device with a heat exchanger and a first evaporative media arranged in fluid communication with the fluid storage device. A heat rejection device includes a second evaporative media arranged in fluid communication with the fluid storage device and the heat exchanger. The apparatus can be operated in two modes. In the first mode, the first evaporative media is activated to use the coolant to cool the air to a first temperature. In the second mode, the first and second evaporative media and the heat exchanger are collectively activated to cool the air to a temperature lower than the first temperature.

While the foregoing inventions present alternatives to conventional air conditioning systems, there is a need for an improved apparatus design. Specifically, there is a need for an improved cooling apparatus with optimized control and operation modes to allow for variable capacity and efficient temperature control for conditioning air and water.

SUMMARY OF THE INVENTION

The following summary is provided to facilitate an understanding of some of the innovative features unique to the disclosed embodiment and is not intended to be a full description. A full appreciation of the various aspects of the embodiments disclosed herein can be gained by taking into consideration the entire specification, claims, drawings, and abstract as a whole.

In one aspect, there is provided an apparatus for cooling air and/or water, said apparatus comprising: a first reservoir for holding a first water volume; a second reservoir for holding a second water volume, wherein the first and second reservoir are in fluid communication with each other; a heat rejection unit comprising at least one evaporative media; a cooling unit comprising at least one evaporative media and at least one pre-cooler; a first water circuit fluidly connecting the at least one pre-cooler and the at least one evaporative media of the cooling unit, the heat rejection unit, the first reservoir and second reservoir; and a second water circuit fluidly connecting the at least one evaporative media of the cooling unit and the second reservoir.

In one embodiment, the first water volume is larger than the second water volume.

In one embodiment, the apparatus further comprises a means for adjusting the water flow through each of the first and second water circuit to provide variable cooling.

In one embodiment, the first reservoir is positioned within the heat rejection unit.

In one embodiment, the second reservoir is positioned within the cooling unit.

In one embodiment, the first water circuit and second water circuit form a closed loop that circulates water from the second reservoir and back again for re-circulation through the apparatus.

In one embodiment, the first water circuit is configured to direct water from the first or second reservoir to the at least one pre-cooler and then to the at least one evaporative media of the heat rejection unit before being directed to the first reservoir.

In one embodiment, the second water circuit is configured to direct water from the second reservoir to the at least one evaporative media of the cooling unit before being circulated back to the second reservoir.

In one embodiment, the apparatus is operable between four modes for variable cooling of the air and/or water.

In one embodiment, the apparatus is operable in a first mode both the first circuit and second circuit are operational to circulate water therethrough; in a second mode only the first circuit is operational to circulate water therethrough; in a third mode only the second circuit is operational to circulate water therethrough; and in a fourth mode both the first circuit and second circuit are not operational.

In one embodiment, the apparatus further comprises a pump coupled to the first and second water circuit.

In one embodiment, the means for adjusting the water flow comprises a valve and/or a flow restriction device to adjust the flow rate and/or volume of the water circulating through either the first and/or second water circuit.

In one embodiment, the heat rejection unit surrounds a first central chamber.

In one embodiment, the cooling unit surrounds a second central chamber.

In one embodiment, the cooling unit and heat rejection unit can be configured to be stacked on each other or separated from one another (i.e. in a first location and second location).

In one embodiment, each of the cooling unit and heat rejection unit are coupled to a variable fan.

In a second aspect, there is provided an apparatus for cooling air and/or water, said apparatus comprising: a first reservoir for holding a first water volume; a second reservoir for holding a second water volume; a heat rejection unit comprising at least one evaporative media; a cooling unit comprising at least one evaporative media and at least one pre-cooler; a first water circuit fluidly connecting the cooling unit and heat rejection unit, wherein the first reservoir is in fluid communication with the at least one pre-cooler of the cooling unit; and a second water circuit fluidly connecting the at least one evaporative media of the cooling unit to the second reservoir.

In one embodiment, the first water circuit is configured to circulate water from the first reservoir to the at least one pre-cooler and then to the evaporative media of the heat rejection unit before being circulated back to the first reservoir.

In one embodiment, the second water circuit is configured to circulate water from the second reservoir to the evaporative media of the cooling unit before being circulated back to the second reservoir.

In one embodiment, the first reservoir is positioned within the heat rejection unit and the second reservoir is positioned within the cooling unit.

In one embodiment, the apparatus further comprises two pumps, wherein one pump is coupled to each of the first and second water circuit.

In one embodiment, each of the cooling unit and heat rejection unit are coupled to a variable fan.

In a third aspect, there is provided a method of conditioning air and/or water comprising the steps of: activating the apparatus disclosed herein to direct ambient air therethrough; adjusting an operational mode to control the water flow and volume through the apparatus to provide variable cooling, whereby the operational mode includes four operational modes; and exhausting warm air and cool air out of the apparatus.

In one embodiment, the water flow and volume of at least one of the first water reservoir, the heat rejection unit, the second water reservoir, a pre-cooler in the main cooling unit and an evaporative porous media in the main cooling unit is adjusted.

In one embodiment, the water flow is adjusted to "deep cooling mode" so that water flows through all circuits.

In one embodiment, the water flow is adjusted to "dry cooling mode" so that water flows through a pre-cooler in the main cooling unit and then through the heat rejection unit.

In one embodiment, the water flow is adjusted to "adiabatic cooling mode" so that water flows through an evaporative porous media in the main cooling unit.

In one embodiment, the water flow is adjusted to "fan mode" with an absence of water flow through either water circuit.

In one embodiment, the method further comprises a step of adjusting water flow based on desired temperature and/or humidity of the conditioned air.

In one embodiment, the method further comprises a step of expelling air from the heat rejection unit away from the gathering area.

In one embodiment, the method further comprises a step of adjusting air flow with one or more variable flow flans.

In one embodiment, the flow of water through the heat rejection is adjusted so that it is greater than the flow of water through the main cooling unit.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the disclosure is not limited to specific methods and instrumentalities disclosed herein. Moreover, those in the art will understand that the drawings are not to scale. Wherever possible, like elements have been indicated by identical numbers.

with the heat rejection unit on top of the main cooling unit and the flow of air therethrough indicated.

Figure 1A:
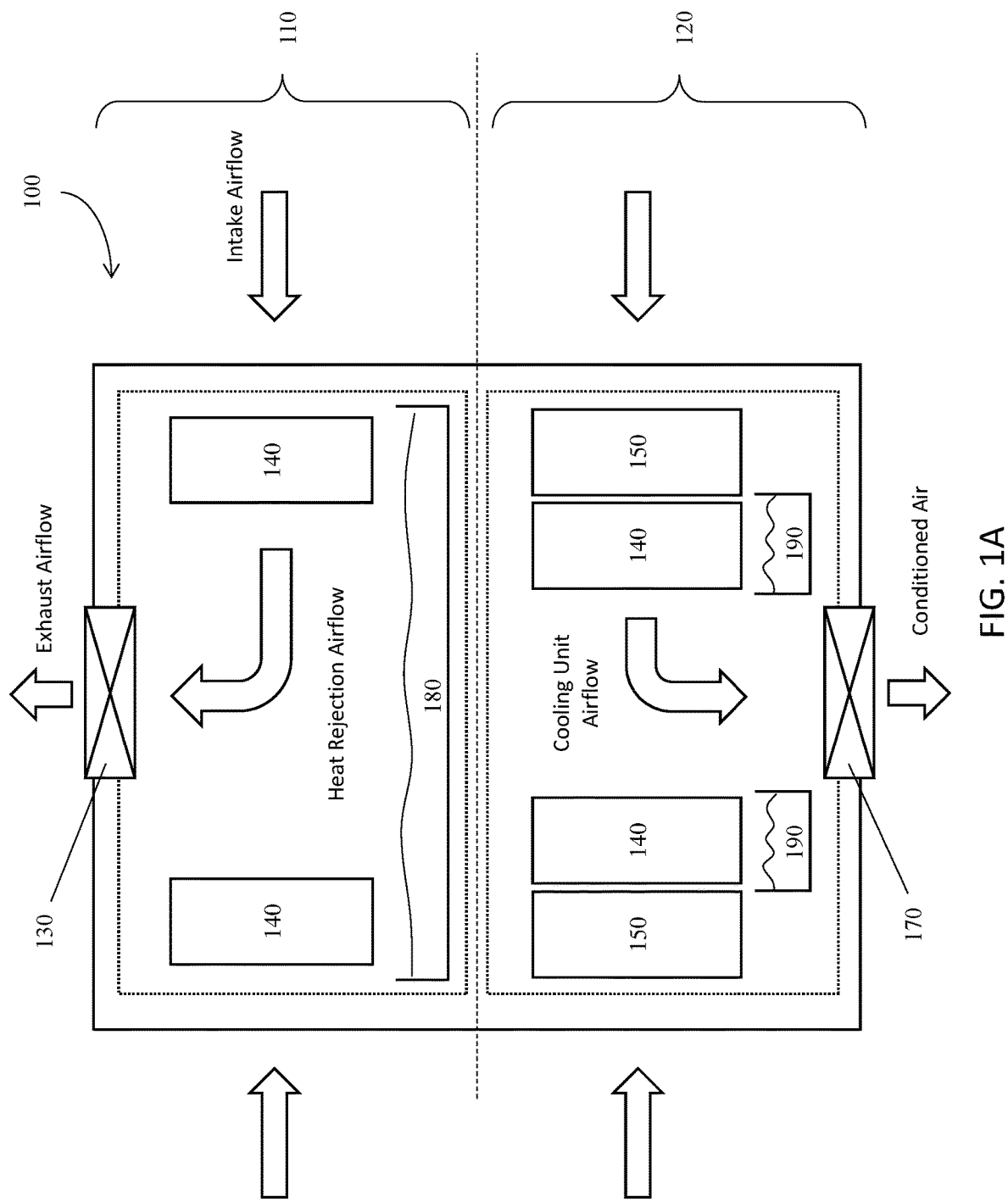
FIG. 1A depicts a cross-sectional view of the components of a variable capacity cooling apparatus (stacked or joined)
Figure 1B:
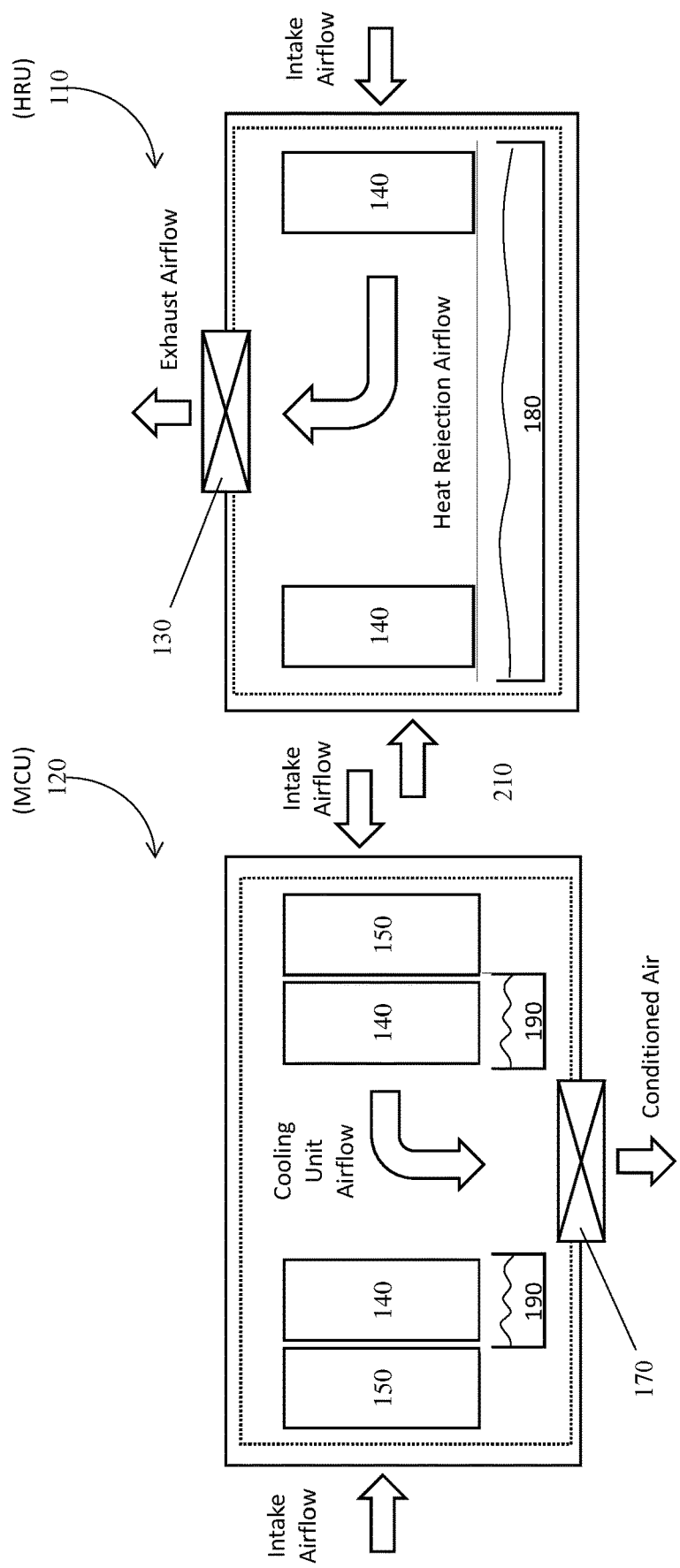

FIG. 1B depicts a cross-sectional view of the components of a variable capacity cooling apparatus (detached from one another but still in fluid communication with one another) and the flow of air therethrough.

Figure 1C:
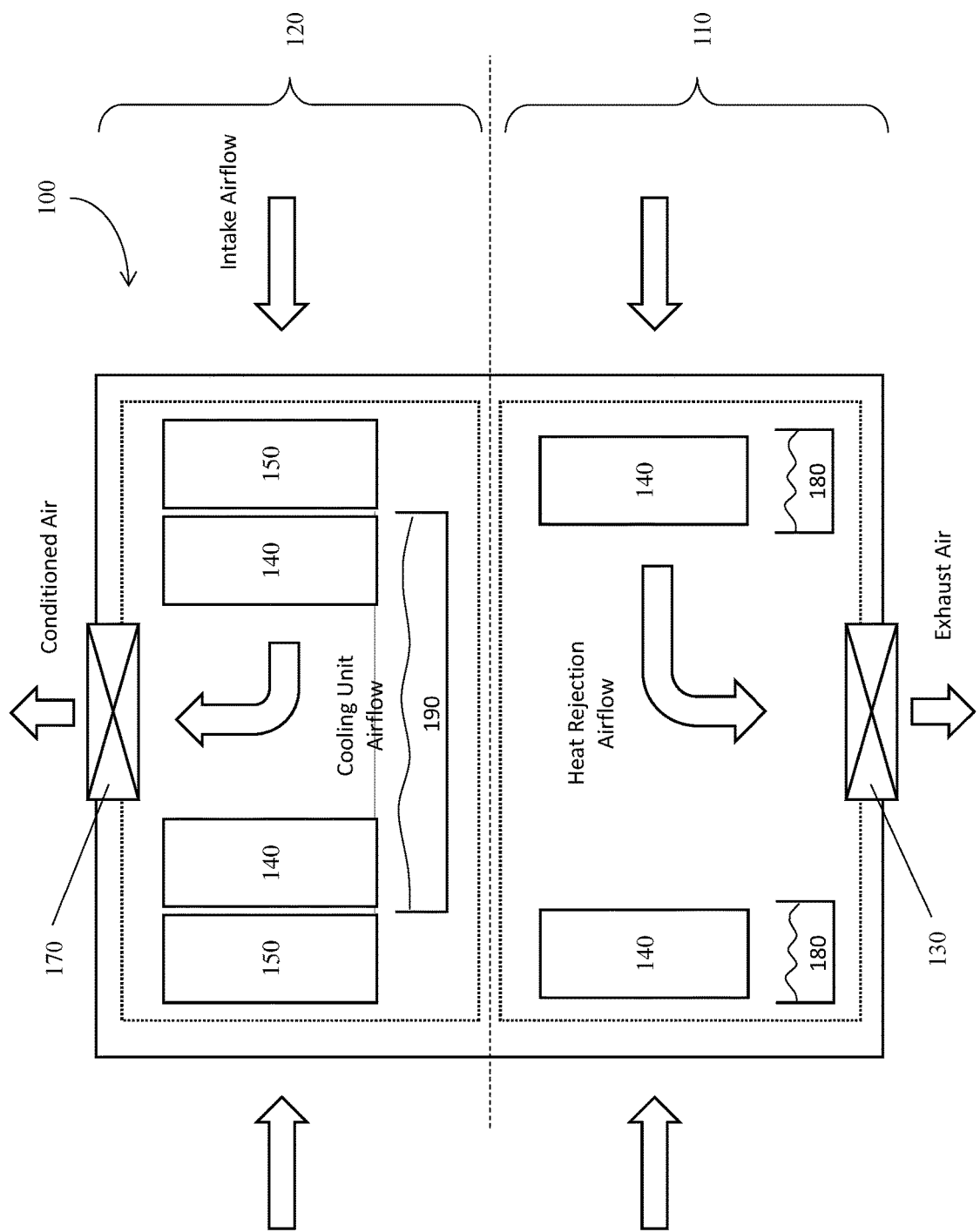

FIG. 1C depicts a cross-sectional view of the components of a variable capacity cooling apparatus (stacked or joined) with the main cooling unit on top of the heat rejection unit and the flow of air therethrough indicated.

Figure 2A:
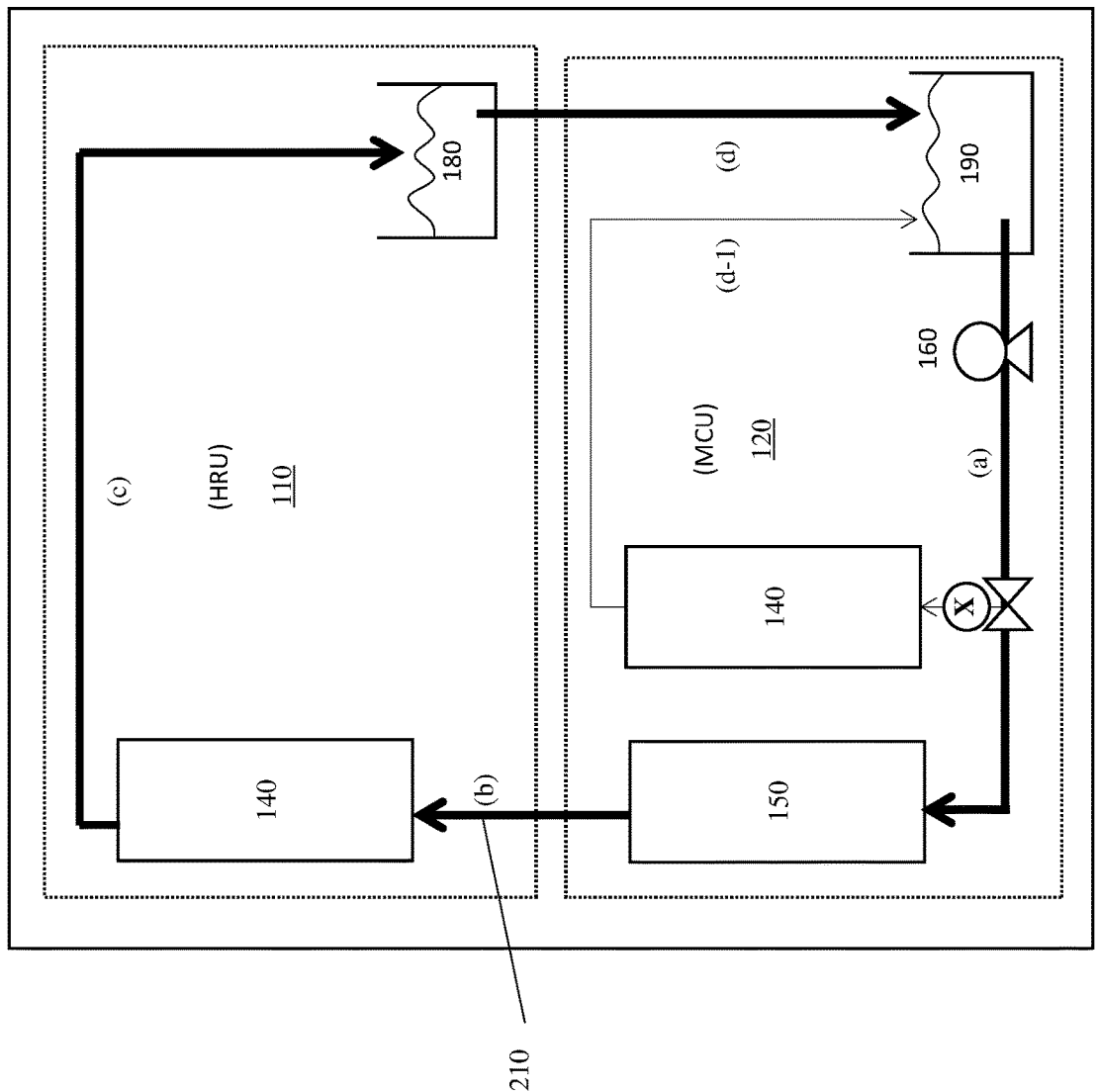

FIG. 2A is a schematic diagram of water circuits in a variable capacity cooling apparatus, with a flow of water through a first water circuit indicated by bold lines. The "X" indicates the restriction of flow or deactivation.

Figure 2B:
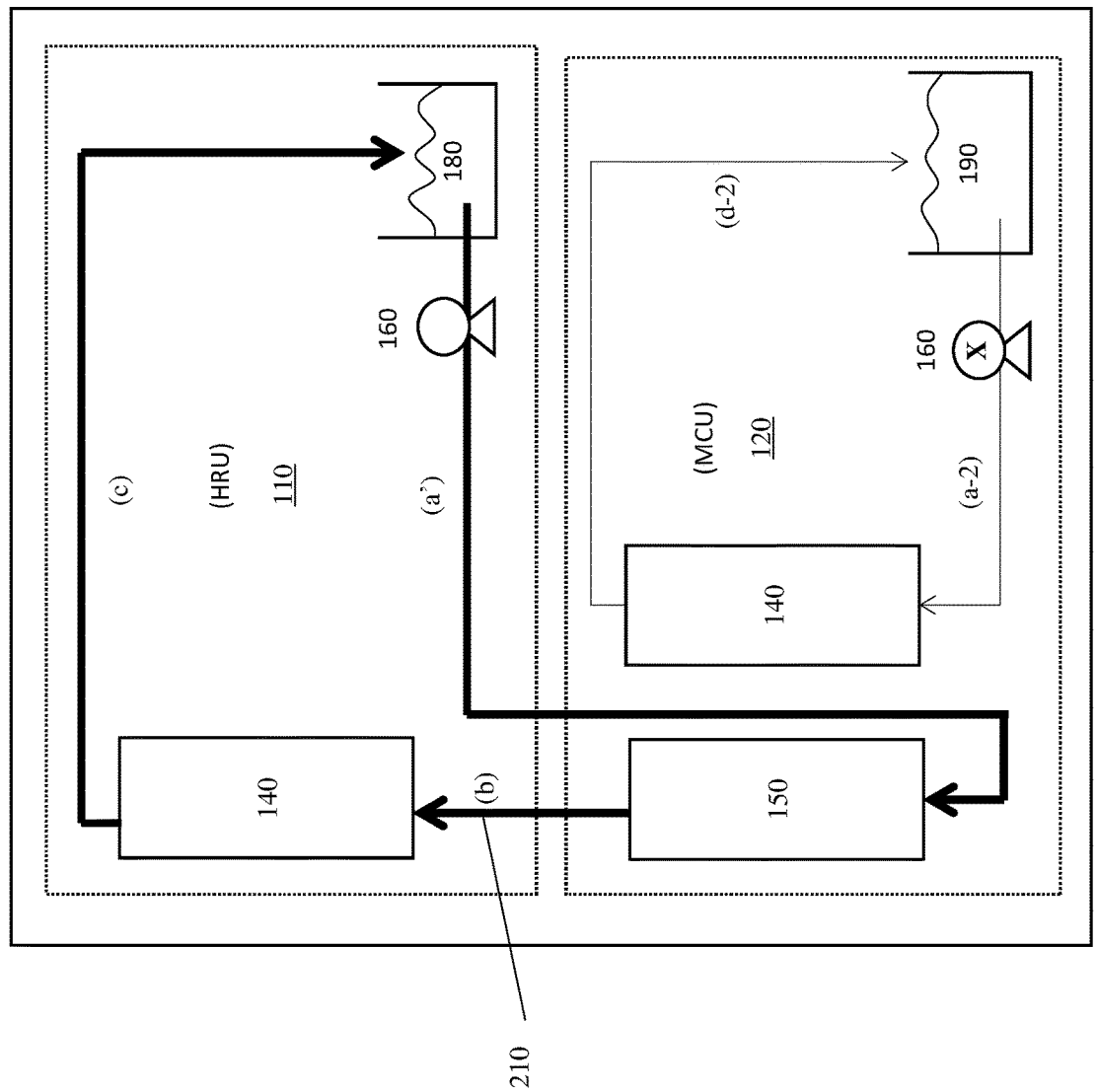

FIG. 2B is a schematic diagram of water circuits in a variable capacity cooling apparatus, with a flow of water through an alternative embodiment to FIG. 2A of the first water circuit indicated by bold lines. The "X" indicates the deactivation of the pump.

Figure 3A:
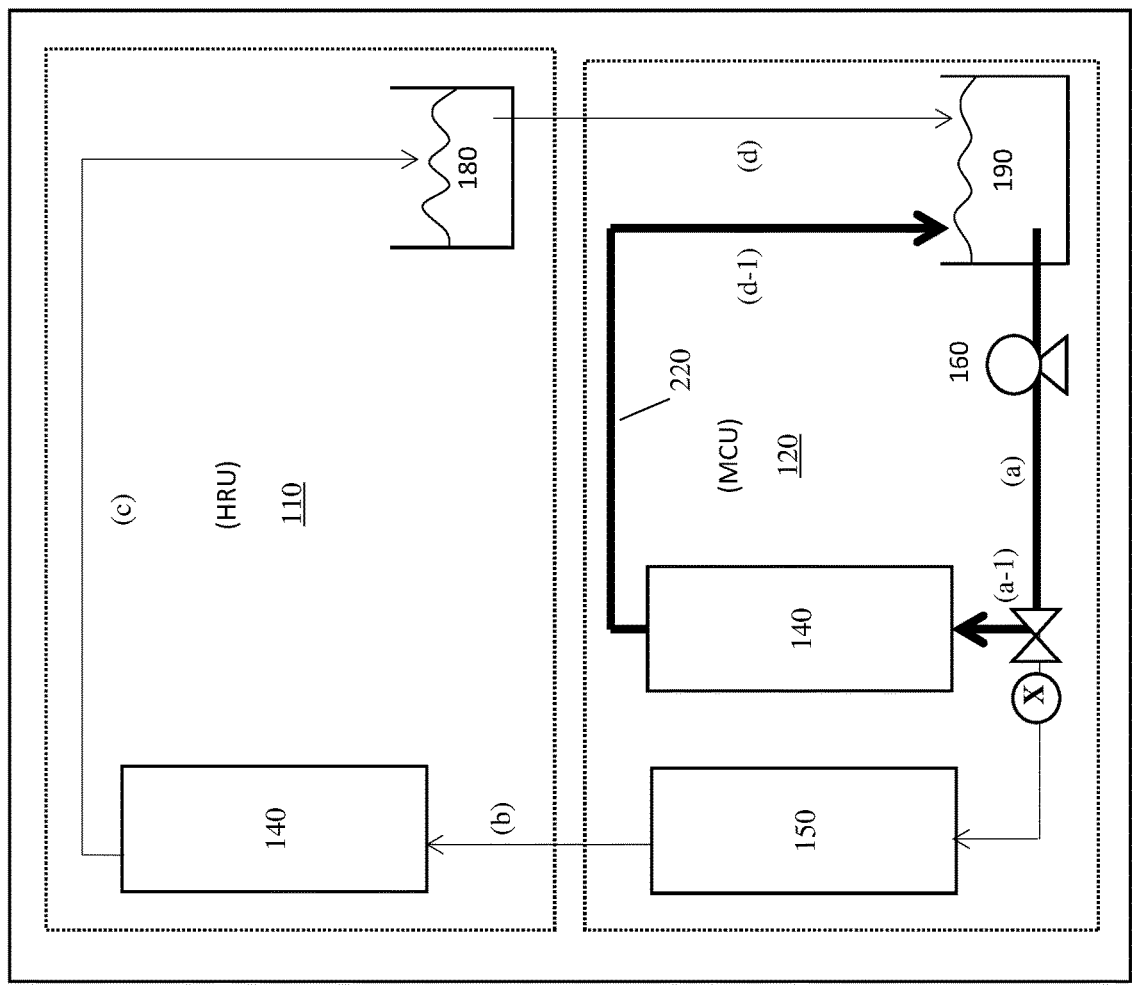

FIG. 3A is a schematic diagram of water circuits in a variable capacity cooling apparatus according to the embodiment of FIG. 2A, with a flow of water through a second water circuit indicated by bold lines. The "X" indicates the restriction of flow or deactivation.

Figure 3B:
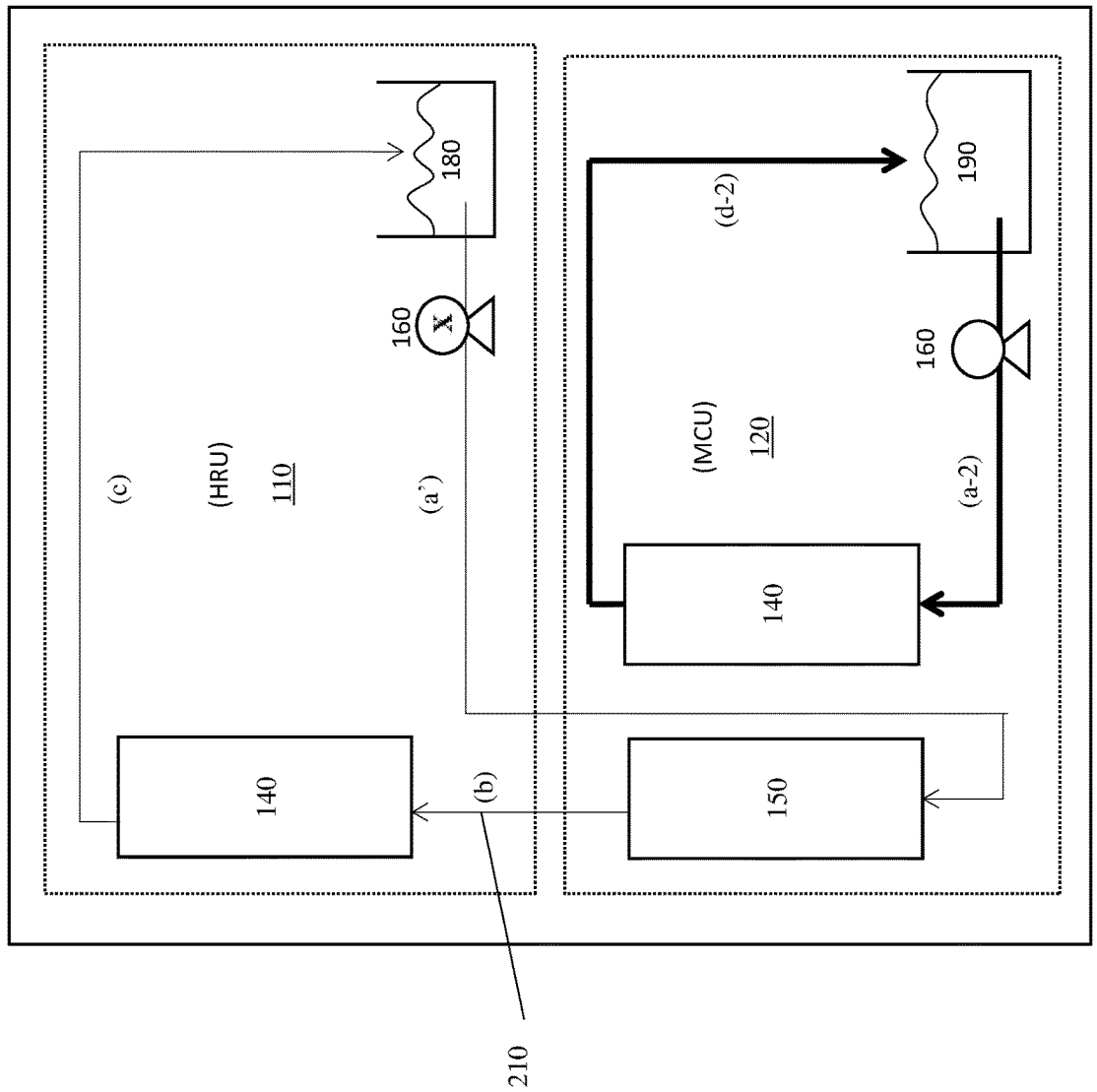

FIG. 3B is a schematic diagram of water circuits in a variable capacity cooling apparatus according to the embodiment of FIG. 2B, with a flow of water through a second water circuit indicated by bold lines. The "X" indicates the deactivation of the pump.

Figure 4A:
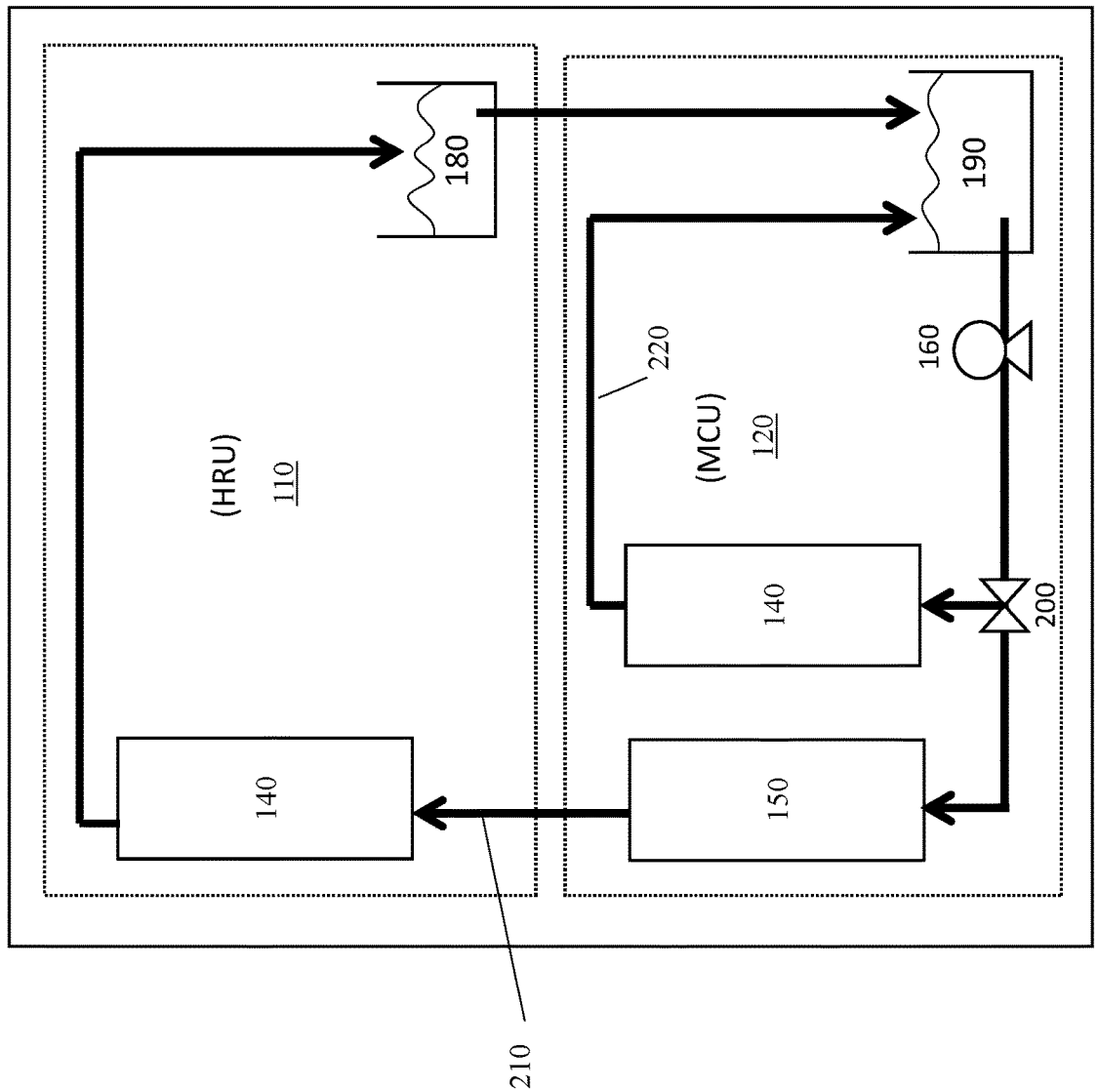

FIG. 4A is a schematic diagram of water circuits in a variable capacity cooling apparatus, with a flow of water through a first and second water circuit indicated by bold lines, according to the embodiments of FIGS. 2A and 3A whereby the MCU unit is positioned beneath the HRU unit.

Figure 4B:
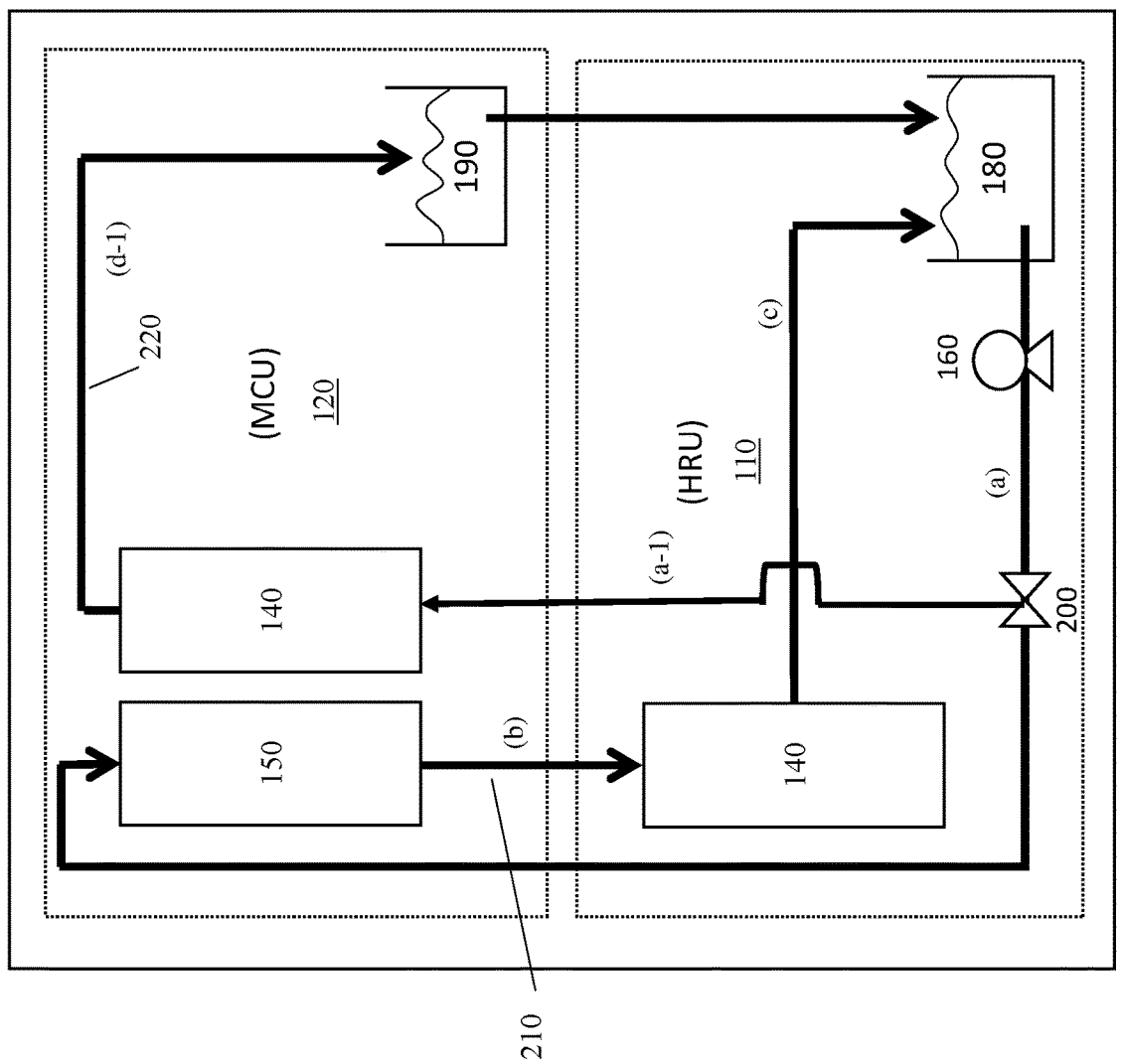

FIG. 4B is a schematic diagram of water circuits in a variable capacity cooling apparatus, with a flow of water through a first and second water circuit indicated by bold lines, according to the embodiments of FIGS. 2A and 3A whereby the MCU unit is positioned on top of the HRU unit.

Figure 4C:
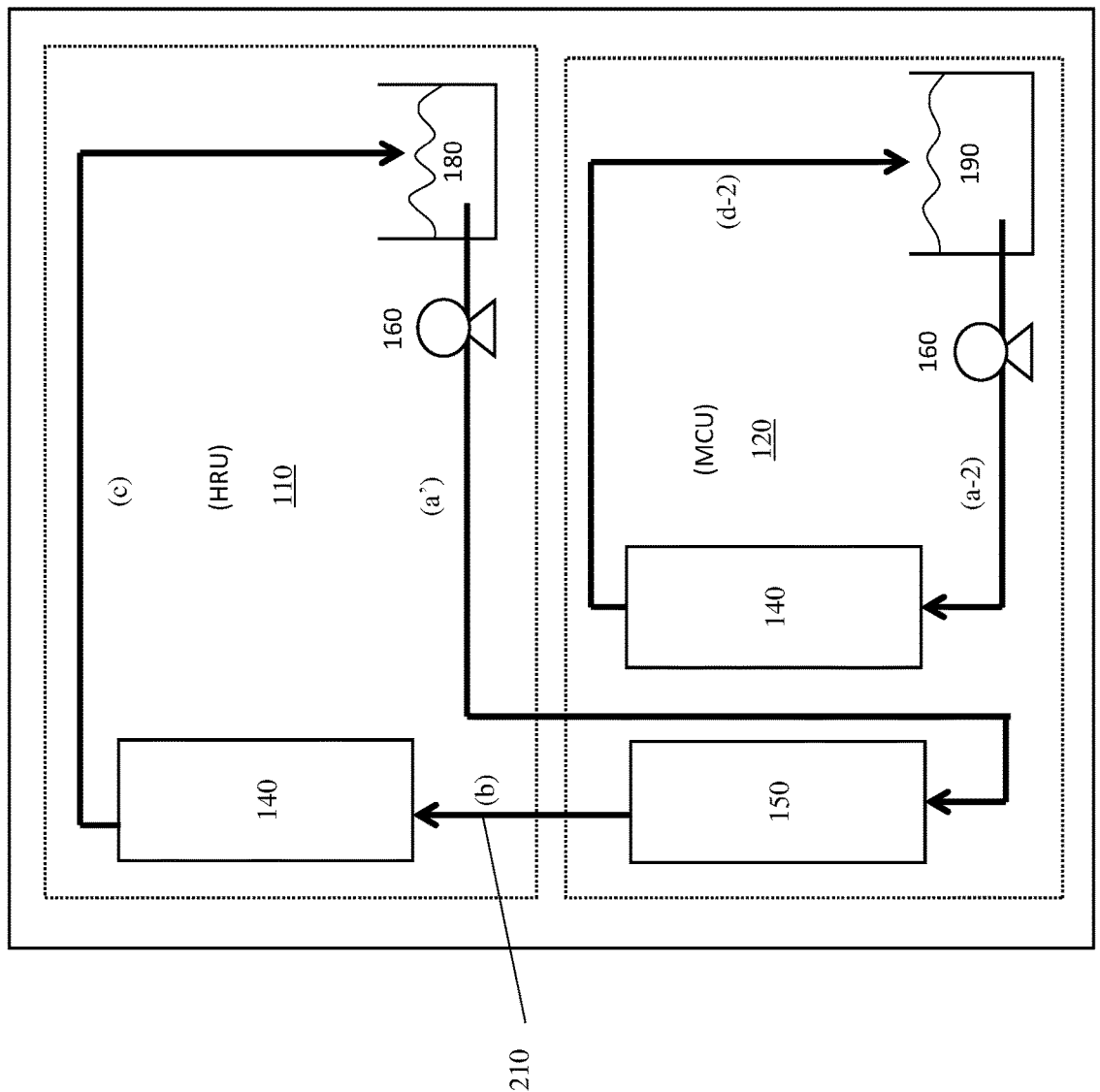

FIG. 4C is a schematic diagram of water circuits in a variable capacity cooling apparatus, with a flow of water through a first and second water circuit indicated by bold lines, according to the embodiments of FIGS. 2B and 3B whereby the MCU unit is positioned beneath the HRU unit.

Figure 4D:
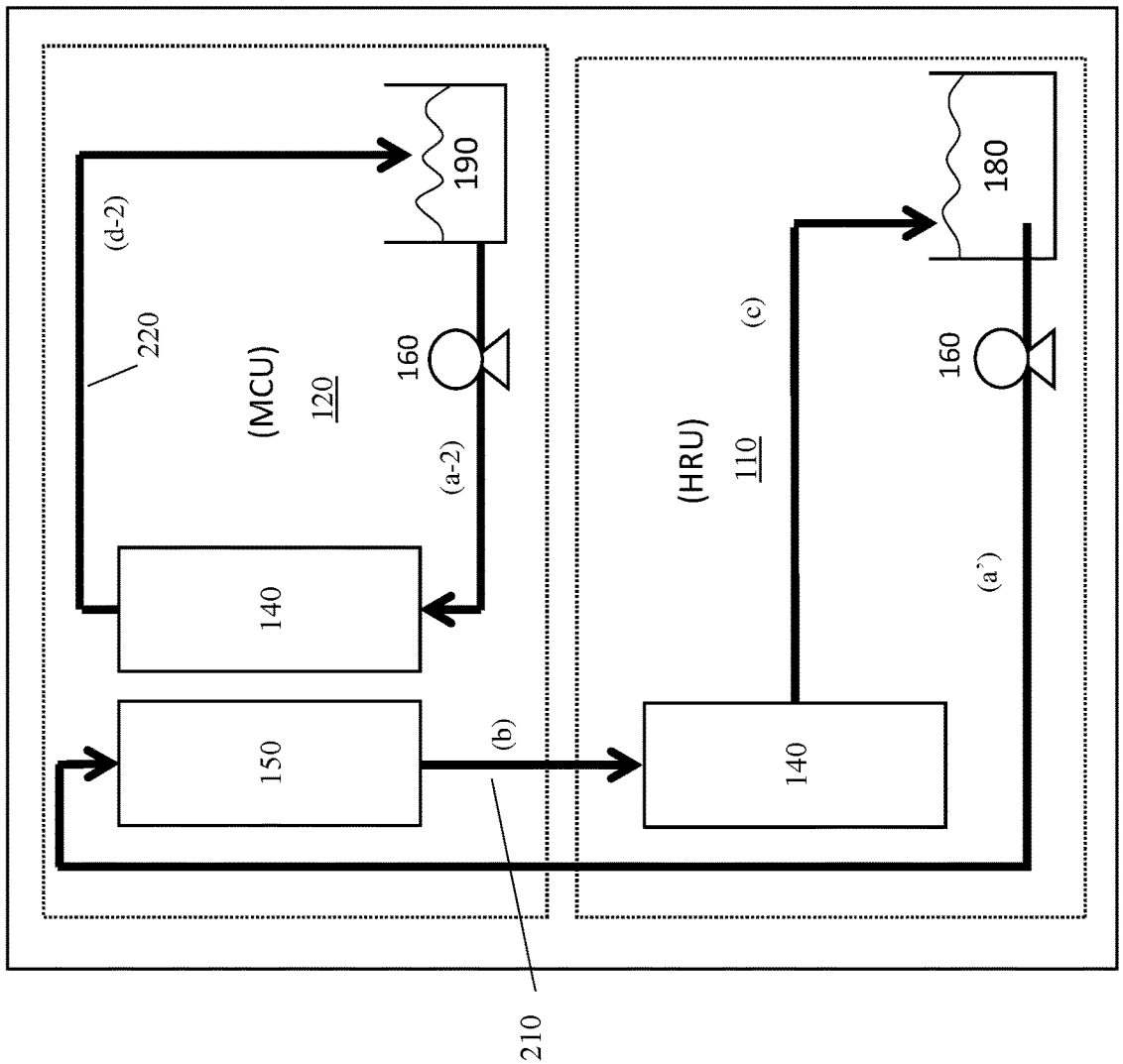

FIG. 4D is a schematic diagram of water circuits in a variable capacity cooling apparatus, with a flow of water through a first and second water circuit indicated by bold lines, according to the embodiments of FIGS. 2B and 3B whereby the MCU unit is positioned on top of the HRU unit.

Figure 5:
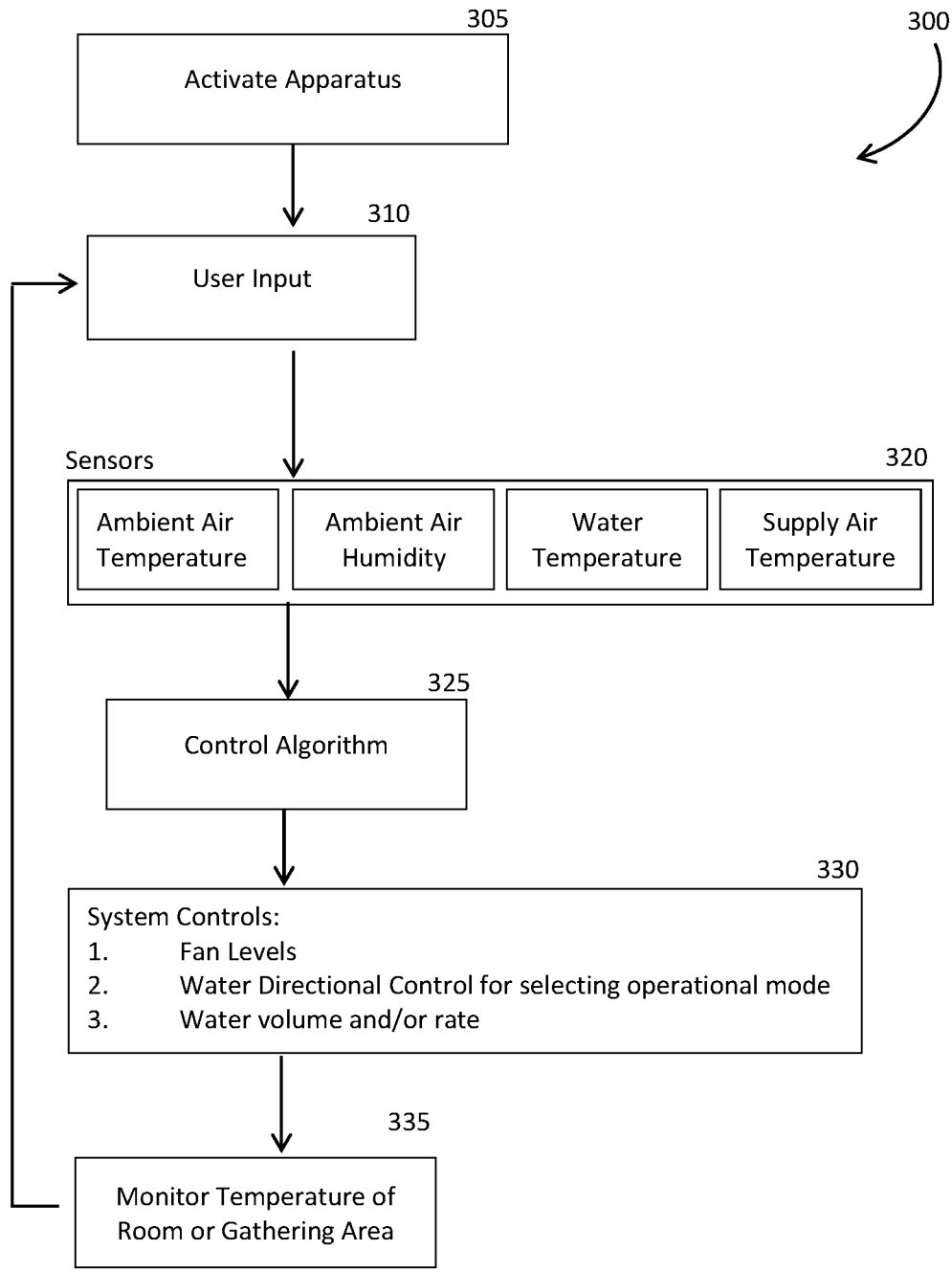

FIG. 5 is a flowchart that depicts the control and method of operation to adjust output of the variable capacity cooling apparatus.

DETAILED DESCRIPTION OF THE INVENTION

Definitions

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

The term "adiabatic" refers to a process that occurs without transfer of heat or matter between a thermodynamic system and its surroundings. In an adiabatic process, energy is transferred to its surroundings only as work (e.g. vaporization of water).

The term "ambient" refers to a condition of outside air at the location at or near the cooling apparatus disclosed herein.

The term "damper" refers to any device or component that can be moved to control (e.g. increase or decrease) the flow of air or liquid through a duct or passage way. Examples of dampers include plates, blades, panels, or discs, or any combination thereof. A damper can include multiple elements. For example, a damper can include a series of plates in parallel relation to one another that can be simultaneously rotated to close a duct.

The term "dew point temperature" refers to the temperature at which air must be cooled to become saturated with water. Air normally contains a certain amount of water vapor. The maximum amount of water vapor that air can hold depends upon the temperature of the air, sometimes referred to as dry bulb temperature ($T_{db}$).

The "dry-bulb temperature" refers to the temperature indicated by a thermometer exposed to the air in a place sheltered from radiation and moisture. The term "dry-bulb" is customarily added to temperature to distinguish it from wet-bulb and dew point temperature.

The term "evaporative media" refers to a porous material that permits the relatively unobstructed evaporation of water into air. For example, a sheet of cotton fabric can be used to allow water to evaporate into ambient air. Evaporation behavior in layered porous media is affected by thickness and sequence of layering and capillary characteristics of each layer.

The term "heat exchanger" refers to a device used to transfer heat between two or more fluids and/or gases. The fluids can be separated by a solid wall to prevent mixing; or they can be in direct contact with one another. As used herein, temperature change is achieved sensibly with a heat exchanger.

The term "pre-cooler" refers to a device such as a heat exchanger that is used to sensibly cool an incoming airstream and transfer heat to water pumped therethrough. Specifically, the pre-cooler can be used to transfer thermal energy from one medium (i.e. ambient air) to another medium (i.e. a water supply) for the purpose of conditioning the air. The pre-cooler can include any suitable heat exchange structure known in the art. As can be appreciated, the pre-cooler can be constructed so that it has a high surface area.

The term "sensible" refers to heat exchanged by a body or thermodynamic system in which the exchange of heat changes the temperature of the body or system, and some macroscopic variables of the body or system, but leaves unchanged certain other macroscopic variables of the body or system, such as volume or pressure.

The "wet-bulb depression" refers to the difference between the dry-bulb temperature and the wet-bulb temperature.

The term "wet bulb temperature" refers to the temperature read by a thermometer covered in water-soaked cloth over which air is passed. At 100% relative humidity, the wet-bulb temperature is equal to the air temperature and is lower at lower humidity. It can be defined as the temperature of a parcel of air cooled to saturation (100% relative humidity) by the evaporation of water into it, with the latent heat supplied by the parcel. The wet-bulb temperature is the lowest temperature that can be reached under current ambient conditions by the evaporation of water only.

The term "valve" refers to any valve that can regulate, direct or control the flow of a fluid by opening, closing, or partially obstructing various passageways of the water circuits.

The term "flow restriction device" refers to a device that can restrict the flow of a fluid through a water circuit to reduce the water flow rate or volume therethrough.

All numerical designations, such as temperature, time, concentration, and weight, including ranges, are to be understood as approximations in accordance with common practice in the art. When used herein, the term "about" may connote variation (+) or (−) 1%, 5% or 10% of the stated amount, as appropriate given the context.

Other technical terms used herein have their ordinary meaning in the art that they are used, as exemplified by a variety of technical dictionaries. The particular values and configurations discussed in these non-limiting examples can be varied and are cited merely to illustrate at least one embodiment and are not intended to limit the scope thereof.

NUMERICAL REFERENCE FEATURES

The following numerical index is provided for ease in cross-referencing between the structural features illustrated in the figures and the accompanying description provided herein.

100—Cooling apparatus
110—Heat Rejection Unit (HRU)
120—Main Cooling Unit (MCU)
130—Exhaust Fan
140—Evaporative Media
150—Pre-cooler (heat exchanger)
160—Pump
170—Supply Fan
180—First Water Reservoir
190—Second Water Reservoir
200—Valve
210—First Water Circuit
220—Second Water Circuit

DESCRIPTION OF PREFERRED EMBODIMENTS

The particular values and configurations discussed in these non-limiting examples can be varied and are cited merely to illustrate at least one embodiment and are not intended to limit the scope thereof. While the invention is described for the conditioning air that is expelled into a room or gathering place, it is understood that the invention is not so limited and can be used to assist with other types of applications that require conditioned air. Other applications include, for example, using the apparatus disclosed herein to condition air for controlled environments. It can be used instead of conventional refrigerants to chill food or other perishable materials. It can condition air and/or remove heat from industrial settings and/or areas with electronic circuits that generate heat. The invention can also be scaled down and up for an intended use. Further, it can be used to condition fluid/water for consumption and/or applications that use chilled fluid/water.

Reference in this specification to "one embodiment/aspect" or "an embodiment/aspect" means that a particular feature, structure, or characteristic described in connection with the embodiment/aspect is included in at least one embodiment/aspect of the disclosure. The use of the phrase "in one embodiment/aspect" or "in another embodiment/aspect" in various places in the specification are not necessarily all referring to the same embodiment/aspect, nor are separate or alternative embodiments/aspects mutually exclusive of other embodiments/aspects. Moreover, various features are described which may be exhibited by some embodiments/aspects and not by others. Similarly, various requirements are described which may be requirements for some embodiments/aspects but not other embodiments/aspects. Embodiment and aspect can be in certain instances be used interchangeably.

The present disclosure relates to a cooling apparatus that provide multiple operational modes with selective control of water flow through cooling elements via separate circuits. This selective control allows for an increased volume of water to flow therethrough for increased heat transfer attributing to efficient recycling of said water through the apparatus and resultant advantageous variable cooling of air and/or water.

The apparatus disclosed herein can apply two types of air conditioning mechanisms. The first applies a pre-cooler that uses sensible heat reduction for cooling air and transferring heat to water pumped therethrough. The pre-cooler can use a heat exchanger with a series of pipes or tubes to increase its surface area with the air. Ambient air contacts the surface of the heat exchanger which has a lower temperature. The temperature difference between the warm ambient air and the heat exchanger results in the transfer of heat. The second applies an evaporative media for adiabatic cooling of air as well as cooling water pumped therethrough. Adiabatic cooling results as surface water evaporates. Sensible heat is converted to latent heat through the vaporization of water. Thus, the temperature of the passing air is reduced through an increase in its humidity. The combination of these conditioning mechanisms allows for outlet supply air temperatures lower that the pre-treatment wet bulb temperature.

An additional benefit obtained as water flows through the evaporative porous media is the lowering of the water temperature through evaporative cooling. Just as heat is removed from air to vaporize water, heat is also simultaneously removed from the unvaporized water in the evaporative medium. The resulting unvaporized water will therefore experience a drop in temperature. The longer the same body of water is pushed through an evaporative cooling process, the lower the water temperature becomes. However, the temperature drop is still limited to the wet bulb temperature of the air that is passed over the water surface. More specifically when referencing to the cooling of water in an evaporative medium, the temperature of the water during the earlier stages in the evaporative medium will be the highest, with the temperature gradually reaching the wet bulb temperature limit as it continues to flow through the evaporative medium before exiting.

In one embodiment, the apparatus can generally include a cooling unit, a heat rejection unit, a water management system and a control system.

The apparatus disclosed herein can be contained within a housing or casing. Alternatively, the cooling unit and heat rejection unit can be contained within separate housings or casings. Each housing or casing can have one or more outlets and an outer periphery provided with inlet openings on its sides for intake air to flow through. The outer periphery can include removable screens located across the inlet openings. The housing and screens can be formed of any suitable material in the art. The dimension of the casing can be of any shape and size, but anyone skilled in the art would understand that the size of the apparatus is largely dependent on the air flow and cooling capacity that is desired, and that the size of the apparatus is in some way proportional to the air flow and cooling capacity.

The cooling unit can condition intake air sensibly and adiabatically, as well as produce cold water. The heat rejection unit can remove heat from circulating water to produce cold water. The water management system provides circulating water for the cooling unit and heat rejection unit and can include pipes/tubing, pumps, valves, flow restriction devices to form fluid paths/circuits. The control system can include a processer with the logic operation for the apparatus and a series of input conditions and output requirements.

The apparatus can be configured and arranged as a stand-alone unit with all components contained in a housing with an air intake to draw in ambient air and an air outlet duct to expel conditioned air. The apparatus can also include components that are common in the art to monitor and control air flow and temperatures such as circuits, fans, valves, flow restriction devices, pipes, filters and a user interface.

FIGS. 1A, 1B and 1C depict some of the components of a cooling apparatus 100 according to an embodiment. The apparatus can include a main cooling unit (MCU) 120, a heat rejection unit (HRU) 110, a water management system and a control system (not shown). The pre-cooler (i.e. heat exchanger) 150, evaporative media 140, first reservoir 180, second reservoir 190, supply fan 170 and exhaust fan 130 are also depicted. The arrows show the directions of the airflow into, through and out of the cooling unit and heat rejection unit of the apparatus.

The supply fan 170 and the exhaust fan 130 drive ambient air into and through the apparatus. Ambient air flows into both the main cooling unit 120 and heat rejection unit 110 where it is treated. Air that enters the main cooling unit 120 passes through the pre-cooler 150 and subsequently through the evaporative media 140, where the air is then directed out of the apparatus as conditioned air. Air that enters the heat rejection unit 110 passes through the evaporative media 140 and is directed out of the apparatus as exhaust air flow.

The conditioned air can be directed toward one or more users whereas the exhaust airflow can be directed in a different direction. In one embodiment, conditioned air is directed into a room or area inside a structure, whereas the exhaust airflow can be directed toward the outside environment. The apparatus can also treat air in an outdoor environment, in which case, conditioned air is directed toward a one or more individuals in a gathering area.

FIGS. 1A, 1B and 1C depict the apparatus where the components are arranged in a square base form, whereby the cooling and heat rejection units are square-shaped each with a central chamber. However, it will be appreciated that the cooling and heat rejection units can form other shapes, for example a pentagonal, hexagonal or octagonal base form, with five, six and eight sides respectively. In another embodiment, the apparatus may be arranged in a circular shape with one continuous side. Regardless of the shaped form of the apparatus the cooling unit and heat rejection unit can each comprise a central chamber.

An apparatus with a square base form can be desired for economic reasons. Having a square base form would mean that components can be made modular and interchangeable, simplifying the layout and structure as well, which ultimately leads to cost savings. Accordingly, in one embodiment the apparatus may be arranged in a square shape with four sides.

In one embodiment, the cooling unit 120 can form the base with the heat rejection unit 110 on top, as illustrated in FIG. 1A. However, the apparatus can function with alternative arrangements of the units. For example, the heat rejection unit 110 can form the base with the cooling unit 120 on top, as illustrated in FIG. 1C. Alternatively, the heat rejection unit 110 and cooling unit 120 can be positioned separate to one another but still in fluid communication with one another. For example, the heat rejection unit 110 and cooling unit 120 can be positioned side by side (i.e. co-planar), as illustrated in FIG. 1B.

FIG. 1B depicts an arrangement of the components of a cooling apparatus 100 positioned side by side from one another, according to an embodiment. The main cooling unit (MCU) 120 is separated from the heat rejection unit (HRU) 110. In this regard, the main cooling unit (MCU) 120 can be separated by a desired distance from the heat rejection unit (HRU) 110 or placed adjacent (i.e. side-by-side) such that the units are in close proximity to one another. It will be appreciated that the units may be positioned co-planar or at differing heights relative to one another. The water management system maintains fluid connectivity between the MCU and HRU. As in FIG. 1A, the pre-cooler 150, evaporative media 140, first reservoir 180, second reservoir 190, supply fan 170 and exhaust fan 130 are also depicted. The arrows show the directions of the airflow into, through and out of the cooling unit and heat rejection unit of the apparatus.

In this regard, the apparatus disclosed herein can be formed of modular separate sections defining the cooling unit and heat rejection unit that can be arranged in a desired configuration dependent on the area for installation. For example, where overall height is an issue for installation or positioning of the apparatus the heat rejection unit 110 and cooling unit 120 can be positioned apart from one another at a desired distance or in close proximity (i.e. side by side). It is appreciated that in all configurations and arrangements of the heat rejection unit 110 and cooling unit 120 relative to one another will remain in fluid connection to one another via the water management system.

Thus, one advantage of a multi-unit system is versatility. The main cooling unit and heat rejection unit can be situated apart from one another to accommodate limited spaces. Further, the heat rejection unit can be located so that the exhaust airflow is directed outside of a dwelling unit or other air conditioned area. The supply fan 170 and the exhaust fan 130 drive ambient air into the apparatus. Intake airflow or ambient air is depicted with arrows. This air flows into the cooling unit 120 and heat rejection unit 110 where it is treated. Air that enters the main cooling unit passes through the pre-cooler 150 (one either side) and through the evaporative media 140, where the air is then directed out of the apparatus as conditioned supply air. Air that enters the heat rejection unit passes through the evaporative media 140 and is then directed out of the apparatus as exhaust air flow.

The water flow between the main cooling unit (MCU) 120 and the heat rejection unit (HRU) 100 is depicted in FIGS. 2A-B, 3A-B and 4A-D. This fluid communication between the units includes a First Water Circuit 210 circulating water from water reservoirs. A Second Water Circuit 220 is also depicted that allows fluid communication between water reservoirs and the evaporative media 140 of the MCU. The illustrated arrows in FIGS. 2A-B, 3A-B and 4A-D are representative of the direction of the water flow through the components of the apparatus, whereby these arrows are not intended to reflect the entry or exit point of the water into or out of the components of the apparatus. For example, the arrows in these figures encompass the water being fed into or exiting the components at the top, bottom or sides of the components and are not limited thereto.

The rate of water flow through the water circuits can be optimized to provide variable cooling. For example, the rate of water flow through the First Water Circuit can be 5-10 times higher than the rate of the Second Water Circuit. Higher water flow through the heat rejection unit allows the system to transfer more heat from the main cooling unit to the heat rejection unit to be expelled as exhaust airflow.

In one embodiment, the apparatus may comprise a means for adjusting the water flow rate and/or volume through the first and second water circuit. In one embodiment, the means for adjusting the water flow rate and/or volume may be a valve and/or a flow restriction device.

In one embodiment, the difference in water flow rate can be achieved by varying the opening size of a valve coupled to one or both water circuit. In the case where the first and second water circuit are interconnected, the valve configuration can be simpler where varying the valve opening to one circuit will cause more or less water to flow through the other circuit (i.e. restricting the water through the second circuit will cause more water to flow through the first circuit). In the case where the first and second water circuit are not connected, valves coupled to the individual circuit can be varied independently, or simply by adjusting the flow rate of a pump coupled to the water circuits without use of any valves.

In one embodiment, the difference in water flow rate can be achieved by a flow restriction device that can be coupled to either the first or second water circuit. For example, if the flow restriction device is installed in the second water circuit, the water flow rate therethrough by default would be lower than that through the first water circuit. The flow restriction device can be a flow limiter or flow restrictor.

The adjustment of the water flow through the individual water circuits can vary the cooling capacity of the apparatus. For example, the water to the evaporative media of the main cooling unit can be turned off. This can provide cool supply air without an increase in moisture content because there is no adiabatic cooling.

Main Cooling Unit (MCU)

The main cooling unit 120 can include at least one pre-cooler and at least one evaporative media to condition air. The pre-cooler includes one or more air-water heat exchangers to condition air sensibly. In one embodiment, one or more sides of the cooling unit can be coupled to one pre-cooler and one evaporative media. For example, in an embodiment where the cooling unit is square-shaped each of the four sides of the unit can be coupled to one pre-cooler and one evaporative media such that the cooling unit can comprise four pre-coolers and four evaporative media.

In another embodiment, where the cooling unit is square-shaped, three sides of the unit can be coupled to one pre-cooler and one evaporative media such that the cooling unit can comprise three pre-coolers and three evaporative medias. In another embodiment, two sides of the unit can be coupled to one pre-cooler and one evaporative media such that the cooling unit can comprise two pre-coolers and two evaporative media. In yet another embodiment, one side of the unit can be coupled to one pre-cooler and one evaporative media such that the cooling unit can comprise one pre-cooler and one evaporative media In one embodiment, each pre-cooler can be positioned in front of each of the evaporative media on each side of the unit with respect to the directional flow of the intake ambient air. In one embodiment, the pre-cooler and evaporative media are the same length such that the pre-cooler covers the front surface of the evaporative media.

In one embodiment, the cooling unit can form a square shape with four sides, whereby each side can be coupled to one pre-cooler positioned in front of one evaporative media.

A supply fan forces ambient air (i.e. intake air) into the main cooling unit and circulates the air through it. In one embodiment, the supply fan can be a variable fan with an adjustable fan speed to vary the cooling capacity and airflow volume through the cooling unit.

Dependent upon the arrangement of the cooling unit in relation to the heat rejection unit, for example on top or beneath, the supply fan can be positioned accordingly on either the bottom or top of the cooling unit to direct the air downwards or upwards respectively, as illustrated in FIGS. 1A and 1C.

After ambient air enters the main cooling unit, it is cooled sensibly as it passes through the pre-cooler. Sensible air conditioning occurs as heat is transferred between water or another fluid pumped through the pre-cooler and the ambient air. The air then flows through the evaporative media. Water flows through the evaporative media and cools the air adiabatically through the vaporization of water, whereby the entering air passes across the wet surface of the evaporative medium with the surface water being heated and evaporated, resulting in adiabatic cooling. Thus, the temperature of the passing air is reduced through an increase in its humidity.

Heat Rejection Unit (HRU)

The heat rejection unit 110 can include at least one evaporative media. The evaporative media of the heat rejection unit can be separate piece to the evaporative media of the cooling unit such that the apparatus does not include one single piece of evaporative media running through both the heat rejection unit and cooling unit.

In one embodiment, each side of the heat rejection unit can be coupled to one evaporative media. For example, in an embodiment where the heat rejection is square-shaped each of the four sides of the unit can be coupled to one evaporative media such that the heat rejection unit will comprise four evaporative media.

In another embodiment, where the heat rejection unit is square-shaped, three sides of the unit can be coupled to one evaporative media such that the unit can comprise three evaporative medias. In another embodiment, two sides of the unit can be coupled to one evaporative media such that the unit can comprise two evaporative medias. In yet another embodiment, one side of the unit can be coupled to one evaporative media such that the unit can comprise one evaporative media In one embodiment, the heat rejection unit can form a square shape with four sides, whereby each side can be coupled to one evaporative media.

The heat rejection unit functions to remove heat from the circulating water from the first circuit and generates cool water to flow back to the first reservoir and subsequently the second reservoir. The water management system disclosed herein can control the flow of water through the heat rejection unit independently of the flow of water through the main cooling unit. A higher water flow through the heat rejection units allows the system to transfer more heat from the MCU pre-cooler side to the HRU side to be rejected/regenerated. Thus, the flow of water through the heat rejection unit can be greater than the flow of water through the main cooling unit. In some embodiments, the flow of water through the heat rejection unit is about 10% greater than the flow of water through the main cooling unit. In other embodiments, the flow is about 25%, about 50%, about 75%, about 100% or about 150% greater. In other embodiments, the flow of water through the heat rejection is about two-fold, about three-fold, about four-fold, about five-fold, about six-fold, about seven-fold, about eight-fold, about nine-fold, about ten-fold, or about fifteen-fold higher than the flow of water through the main cooling unit.

In one embodiment, the heat rejection unit can include an exhaust fan or other apparatus to drive air out of and away from the unit. The exhaust fan pulls air through the evaporative media to facilitate the evaporative cooling process. The resultant warm exhaust air is directed away from apparatus. In one embodiment, the exhaust fan can be a variable fan with an adjustable fan speed to vary the airflow volume through the heat rejection unit.

Dependent upon the arrangement of the heat rejection unit in relation to the cooling unit, for example on top or beneath, the exhaust fan will be positioned accordingly on either the bottom or top of the heat rejection unit to direct the air downwards or upwards respectively, as illustrated in FIGS. 1A and 1C.

Water Management System

In order for the cooling apparatus disclosed herein to condition intake air sensibly and adiabatically as well as produce cold water, a water management system can be included for fluidly connecting the cooling unit and heat rejection unit.

In this regard, the water management system can include at least one water circuit to fluidly connect at least one water reservoir to the pre-cooler and the evaporative media of the cooling unit as well as the evaporative media of the heat rejection unit. It will be appreciated that appropriate suitable fluids or coolants other than water can be used in the apparatus disclosed herein. One or more pumps can create pressure to drive the liquid through the at least one water circuit.

In one embodiment, the water management system can include at least two water reservoirs. In particular, the water management system can include a first water reservoir and a second water reservoir. The first and second water reservoirs can store water for the heat rejection unit and main cooling unit respectively.

The first water reservoir can be located within the heat rejection unit and is in fluid communication with the main cooling unit. The second water reservoir can be located within the main cooling unit and is in fluid communication with the evaporative media of the main cooling unit. In some embodiments, the second water reservoir can additionally be in fluid communication with the pre-cooler.

In one embodiment, the first water reservoir and second water reservoir can be positioned beneath the evaporative media of the heat rejection unit and main cooling unit, respectively. However, it will be appreciated that the first and second water reservoirs can be positioned elsewhere in the respective units so long as the water flow from the evaporative media can be collected for storage.

The first water reservoir 180 can be a single container spanning the base or bottom of the heat rejection unit to collect water from the evaporative medias 140 in the heat rejection unit. The second water reservoir 190 can be a single container spanning the base or bottom of the main cooling unit to collect water from the evaporative medias 140 in the main cooling unit.

In one embodiment, there is only one container/collector for each unit. In one embodiment, there is only one container for each of the first and second water reservoir, respectively. The water containers in FIG. 1A-C for each respective reservoir are illustrated as separate containers only for the purpose of illustrating an uninterrupted path of air through the apparatus and is not intended to illustrate that the reservoirs contain multiple separate containers.

As will be appreciated, the arrangement and positioning of the first and second water reservoirs within the units and with respect to the evaporative medias can be dependent upon the positioning of the exhaust/supply fan in either the base or bottom of the units or the top of the units.

In one embodiment, the first water reservoir and second water reservoir are in fluid communication with each other, as illustrated in FIGS. 2A and 4A-B. The fluid communication between the reservoirs allows for any excess water generated in the apparatus to be diverted or distributed between both reservoirs. In particular, water stored within the first reservoir 180 can flow to the second water reservoir 190 and vice versa. This fluid communication and connectivity between the reservoirs enables the apparatus to achieve higher efficiency through the additional heat regeneration capacity of the evaporative media in the cooling unit, relative to if these reservoirs were not fluidly connected.

The size and configuration of the first water reservoir and second water reservoir can be largely dependent upon the positioning of the units, and the positioning of the fan.

As will be appreciated, the flow of water between the reservoirs can be dependent on the positioning of the MCU and HRU units relative to one another. It is of interest to minimize the number of components required within the system and utilize the help of gravity where possible.

Accordingly, water can flow from the first reservoir 180 to the second reservoir 190 before being circulated in the water circuits for cases where the MCU is placed beneath the HRU as per FIGS. 1C and 4A. However, for cases where the MCU is placed above the HRU as per FIGS. 1A and 4B, water can flow from the second reservoir 190 to the first reservoir 180 before being circulated in the water circuits.

In an alternative configuration, the first water reservoir 180 and the second water reservoir 190 need not be connected or be in fluid communication with one another, as illustrated in FIGS. 2B and 4C-D. Accordingly, in one embodiment the first water reservoir and second water reservoir are not in fluid communication with each other. In particular, the first water reservoir 180 can be in direct fluid communication with the pre-cooler 150 of the main cooling unit 120. This configuration and lack of fluid communication between the reservoirs can be advantageous in the scenario where the MCU and HRU need to be separated relative to one another. In such a case, it is preferred to limit the need for additional pipes to connect the two water reservoirs to circulate water from one reservoir to the next through mechanical means which would incur higher operational and capital costs. Nevertheless, it is appreciated that the positioning of the MCU and HRU units adjacent or distant from one another does not preclude the water reservoirs being fluidly connected to each other.

In one embodiment, the water management system can include at least two water circuits to allow for fluid communication and connection between the components of the cooling unit and heat rejection unit and water reservoirs. The at least two circuits, either in combination or separately, can form a closed loop that circulates water from the first and/or second reservoir around the units and back to the first and/or second reservoir for subsequent re-circulation. Accordingly, in one embodiment the at least two water circuits can form a closed loop system.

It will be appreciated that the design of the water circuits can be modified dependent on the physical arrangement of the apparatus and components of FIGS. 1A, 1B and 1C. In particular, the arrangement of the water circuits and connections to components can be modified dependent upon if the MCU unit is positioned on top or beneath of the HRU unit, as illustrated in FIG. 4A-D.

In one embodiment, the at least two circuits can include a first water circuit 210 and a second water circuit 220. In one embodiment, the first water circuit and second water circuit can each form a closed loop system. In another embodiment, the first water circuit and second water circuit in combination form a closed loop system The circuits can fluidly connect the components (cooling components and reservoirs) of the water management system by water lines, pipes or tubes which provide substantially fluid-tight passages for water therethrough. As will be readily appreciated in the technical field, the water management system can include conventional components for enabling water flow circulation and regulation as well as adjusting the water flow through said circuits, such as pumps, valves and flow restriction devices.

In one embodiment, the volume of water flow through each of the first and second water circuit can be adjusted to provide variable cooling capacity. For example, the volume of water flow directed to the evaporative media of the heat rejection unit can be increased relative to the volume of water flow directed to the evaporative media in the cooling unit. This variable water volume through each of the first water circuit and second water circuit allows the apparatus to transfer more heat from the pre-cooler to the heat rejection unit for rejection/regeneration. Specifically, a higher water flow volume directed to the evaporative media of the heat rejection unit compared to the evaporative media in the cooling unit can increase the transfer of heat from the pre-cooler to the heat rejection unit.

In one embodiment, the volume of water flow through the first water circuit can be at least equal or more than the volume of water flow through the second water circuit. In one embodiment, the volume of water flow through the second water circuit can be sufficient to at least maintain the evaporative media in a wet state.

Adjustment of the water flow through each of the first and second water circuit can be achieved by a means for adjusting the water flow rate. The means for adjusting the water flow rate can include but is not limited to at least one pump, a valve and/or a flow restrictions device.

Accordingly, in one embodiment the water management system can include at least one pump coupled to the first and second water circuit to drive water from the first and/or second water reservoir through both the first and second water circuit.

In one embodiment, the apparatus can comprise a single pump coupled to both the first and second water circuits for driving water through a shared flow line (a). In another embodiment, the apparatus can comprise two pumps with each pump coupled to one of the first and second water circuits for driving water through separate flow lines. In one embodiment, the at least one pump can be a variable speed pump.

In one embodiment, the first and second water circuits can be fluidly connected with one another such that they share a flow line for water to be directed through from the first or second water reservoir, as illustrated in FIGS. 2A, 3A and 4A-B.

FIG. 2A depicts an exemplary embodiment of the first water circuit 210 (bold lines) fluidly connecting the cooling unit 120, heat rejection unit 110, first water reservoir 180 and second water reservoir 190 by flow lines. In one embodiment, the first water circuit can be arranged to circulate fluid from the second water reservoir 190 to the pre-cooler 150 via flow line (a) and then to the evaporative media 140 of the heat rejection unit 110 via flow line (b) before being circulated to the first water reservoir 180 via flow line (c) and then subsequently to the second water reservoir 190 via flow line (d).

FIG. 3A depicts an exemplary embodiment of the second water circuit 220 (bold lines) fluidly connecting the cooling unit 120 and second water reservoir 190. In one embodiment, the second water circuit 220 can be arranged to circulate water from the second water reservoir 190 to the evaporative media 140 of the cooling unit 120 via flow lines (a and a-1) before being circulated back to the second reservoir 190 via flow lines (d-1).

FIG. 4A depicts the embodiments of the water circuits of FIGS. 2A and 3A whereby the MCU unit 120 is positioned beneath the HRU unit 110.

FIG. 4B depicts an embodiment of the water circuits of FIGS. 2A, 3A and 4A whereby the MCU 120 unit is positioned on top of the HRU unit 110 such that the positioning of the first water reservoir 180 and second water reservoir 190 are switched with one another. In this embodiment, the first water circuit can be arranged to circulate fluid from the first water reservoir 180 to the pre-cooler 150 and then to the evaporative media 140 of the heat rejection unit 110 before being circulated to the first water reservoir 180. The second water circuit 220 fluidly connect the cooling unit 120 and second water reservoir 190. In addition, the second water circuit 220 can be arranged to circulate water from the first water reservoir 180 to the evaporative media 140 of the cooling unit 120 before being circulated to the second reservoir 190. In this embodiment, the two water reservoirs are in fluid communication such that water flows from the second water reservoir 190 into the first water reservoir 180.

In one embodiment, the water management system can include at least one valve 200 coupled to the first 210 and second water circuit 220 to selectively operate and control water flow from the second water reservoir 190 through both the first 210 and second water circuit 220. In one embodiment, the valve can be a control valve.

In one embodiment, the selective operation and circulation of the first water circuit 210 and second water circuit 220 can include a valve 200 and a pump 160, as shown in FIGS. 4A and 4B. The valve 200 and/or pump 160 can adjust the pressure and flow through the flow lines, pipes or tubes.

The valve 200 can be controlled to divert, "by-pass" or "bleed-off" water from flow line (a) to drive the water to the evaporative media 140 of the cooling unit 120 via flow line (a-1). In one embodiment, the water management system can include a valve to enable selective operation and circulation of water flow through either the first water circuit 210 and/or second water circuit 220. In one embodiment, the valve can be controlled to by-pass the pre-cooler such that water from the first or second reservoir can flow directly to the evaporative porous media 140 of the cooling unit. In one embodiment, the valve 200 can be any valve capable of controlling the amount of water flowing therethrough such as a control valve. The valve 200 can be adjusted to direct water from the first 180 or second reservoir 190 to only flow to the pre-cooler 150 and then to the evaporative media 140 of the heat rejection unit via the first water circuit 210. Alternatively, the valve 200 can be adjusted to direct water from the first 180 or second reservoir 190 to only flow to the evaporative media 140 of the cooling unit via the second water circuit 220. Further, the valve 200 can be adjusted to direct water from the first 180 or second reservoir 190 to flow to both of the evaporative media units 140 via both the first water circuit 210 and the second water circuit 220.

In one embodiment, the water management system as illustrated in FIGS. 2A, 3A and 4A-B can include at least one flow restriction device (not shown) coupled to the first 210 and/or second water circuit 220 to selectively operate and control water flow through one or both the first 210 and second water circuit 220. The at least one flow restriction device can be used in addition to the valve 200 or be coupled to the water circuits in place of the valve 200 to control the flow rate therethrough.

In one embodiment, the flow restriction device can be a flow restrictor or flow limiter. In one embodiment, the selective operation and circulation of the first water circuit 210 and second water circuit 220 can include a flow restriction device and/or a valve 200 in addition to a pump 160.

In another embodiment, the first and second water circuits can form separate discrete circuits that are not fluidly connected with one another such that water flows through separate flow lines from the first and second water reservoir, as illustrated in FIGS. 2B, 3B and 4C-D.

FIG. 2B depicts another exemplary embodiment of the first water circuit 210 (bold lines) fluidly connecting the cooling unit 120, heat rejection unit 110 and first water reservoir 180 by flow lines. In one embodiment, the first water circuit can be arranged to circulate fluid from the first water reservoir 180 to the pre-cooler 150 via flow line (a') and then to the evaporative media 140 of the heat rejection unit 110 via flow line (b) before being circulated back to the first water reservoir 180 via flow line (c).

FIG. 3B depicts another exemplary embodiment of the second water circuit 220 (bold lines) fluidly connecting the cooling unit 120 and second water reservoir 190. In one embodiment, the second water circuit 220 can be arranged to circulate water from the second water reservoir 190 to the evaporative media 140 of the cooling unit 120 via flow line (a-2) before being circulated back to the second reservoir 190 via flow line (d-2).

FIG. 4C depicts the embodiments of the water circuits of FIGS. 2B and 3B whereby the MCU unit is positioned beneath the HRU unit.

FIG. 4D depicts an embodiment of the water circuits of FIGS. 2B, 3B and 4C whereby the MCU unit is positioned on top of the HRU unit such that the positioning of the first water reservoir 180 and second water reservoir 190 are switched with one another. In this embodiment, the first water circuit can be arranged to circulate fluid from the first water reservoir 180 to the pre-cooler 150 and then to the evaporative media 140 of the heat rejection unit 110 before being circulated back to the first water reservoir 180. In addition, the second water circuit 220 can be arranged to circulate water from the second water reservoir 190 to the evaporative media 140 of the cooling unit 120 before being circulated back to the second reservoir 190.

In one embodiment, the selective operation and circulation of the first water circuit 210 and second water circuit 220 can include two pumps 160 with each pump being coupled to one circuit to drive water therethrough, as shown in FIGS. 4C and 4D. The pump 160 can adjust the pressure, speed and flow through the flow lines, pipes or tubes. A valve (not shown) can also be added for additional selective operation and control of water flow through each of the first water circuit 210 and second water circuit 220.

In one embodiment, the water management system as illustrated in FIGS. 2B, 3B and 4C-D can include at least one flow restriction device (not shown) coupled to the first 210 and/or second water circuit 220 to selectively operate and control water flow through one or both the first 210 and second water circuit 220. In one embodiment, the flow restriction device can be a flow restrictor or flow limiter. In one embodiment, the selective operation and circulation of the first water circuit 210 and second water circuit 220 can include a flow restriction device and at least two pumps 160.

Operational Modes

The efforts of the cooling unit and heat rejection unit can be adjusted according to a most efficient operating mode or conditioning requirements. Adjustment of the water flow through the apparatus can modulate the airflow cooling capacities of the cooling unit and heat rejection unit. This allows for regulation of the output air temperature of the cooling unit.

In one embodiment, the water flow through the cooling unit and heat rejection unit can be individually controlled and adjusted to provide variable cooling. Specifically, operation of the water circuits can be activated "turned-on" or deactivated "turned-off" to vary the cooling capacity of the apparatus.

For example, the water flow to the evaporative media of the cooling unit can be turned off to provide cool supply air without an increase in moisture content (i.e. humidity) that comes from the evaporation of water through the evaporative media of the cooling unit. This operational control of the water flow through the apparatus could not be achieved with a single piece of evaporative media ran through both the heat rejection unit and cooling unit.

In one embodiment, the water flow through the apparatus can be adjusted through activation or deactivation of one or both of the first and second water circuits.

The apparatus disclosed herein can operate multiple modes of cooling air and/or water with the selective activation of water circuits. In one embodiment, the apparatus can operate in at least four modes. In one embodiment, the apparatus can operate in four modes as follows with reference to the exemplary embodiments illustrated in FIG. 4A-D:

Mode 1: Deep-cooling mode—Water flows through all the components with all water circuits activated;

Mode 2: Dry-cooling mode—There is no absolute humidity increase and water flows through the pre-cooler and subsequently evaporative media of the heat rejection unit;

Mode 3: Adiabatic cooling mode—Water flows through only the evaporative media of the cooling unit; and Mode 4: Fan mode—Water does not flow through any components with all water circuits deactivated.

Accordingly, in one embodiment the apparatus can be operated in a first mode, a second mode, a third mode or a fourth mode, in which the selection of the mode may be done by the user manually selection the desired cooling more, or programmed into a control system to automatically switch between cooling mode to provide thermal comfort. Each of the cooling modes are further described as follows.

The four operational modes apply to all embodiments of the apparatus regardless of the first and second water circuits being fluidly connected with one another (FIGS. 2A, 3A and 4A-B) or forming separate discrete circuits that are not fluidly connected with one another (FIGS. 2B, 3B and 4C-D).

First Mode [Deep-Cooling]

The first mode is depicted in FIG. 4A-D. In this mode, water flow is directed through both the cooling unit 110 and heat rejection unit 120. In one embodiment, the first mode includes both the first circuit 210 and second circuit 220 being operational to circulate fluid therethrough. In this first mode, both water circuits and all the components are activated. In addition, both the supply and exhaust fans are also activated.

In FIG. 4A-B, the valve 200 is adjusted to direct water to flow though both the pre-cooler 150 and the evaporative media 140 of the cooling unit as well the evaporative media 140 of the heat rejection unit. Water from the first or second water reservoir will flow into the other reservoir before being circulated to the first and second water circuits.

In FIG. 4C-D, the two pumps 160 separately direct water to flow through the first and second water circuits so that water is directed through the pre-cooler 150 and the evaporative media 140 of the cooling unit as well the evaporative media 140 of the heat rejection unit. Water from the first water reservoir will not flow into the second water reservoir and vice versa.

Second Mode [Dry-Cooling]

The second mode is depicted in FIGS. 2A and 2B. In this mode, water flow is directed through both the cooling unit 110 and heat rejection unit 120. In this mode, the first water circuit 210 can be activated and the second water circuit 220 is deactivated. Water in the main cooling unit flows only through the pre-cooler 150 where it is cooled sensibly. The water does not flow through the evaporative porous media of the main cooling unit. In this second mode, only the first water circuit and associated components are activated. In addition, both the supply and exhaust fans are also activated.

In FIG. 2A, the valve 200 is adjusted to direct water to flow though only the pre-cooler 150 of the cooling unit and subsequently the evaporative media 140 of the heat rejection unit. Water flow occurs between the first water reservoir 180 and the second water reservoir 190 before being circulated to the first water circuit (dependent upon the arrangement of the MCU and HRU units).

In FIG. 2B, the pump of the second water circuit is deactivated such that the second water circuit is deactivated and second water reservoir is unused. In contrast, the pump coupled to the first water circuit is activated such that the first water circuit is activated and water flows from the first water reservoir.

Third Mode [Adiabatic Cooling]

The third mode is depicted in FIGS. 3A and 3B. In this mode, the first water circuit 210 can be deactivated and the second water circuit 220 is activated. In one embodiment, the third mode includes the second water circuit being operational to circulate fluid therethrough. In this third mode, only the second water circuit and associated components are activated. In addition, the supply fan is activated while the exhaust fan is deactivated.

In FIG. 3A, the valve 200 is adjusted to direct water to flow through only the evaporative media 140 of the cooling unit and to the second water reservoir 190.

In FIG. 3B, the pump of the first water circuit is deactivated such that the first water circuit is deactivated and first water reservoir is unused. In contrast, the pump coupled to the second water circuit is activated such that the second water circuit is activated and water flows from the second water reservoir and re-circulated back.

Fourth Mode [Fan]

In this mode, there is no water flow through either the cooling unit 110 and heat rejection unit 120. In particular, the valve 200 is adjusted or the water pump 160 is switched off to prevent water to flow though both the cooling unit 110 and heat rejection unit 120. In this mode, the first water circuit 210 and the second water circuit 220 can be deactivated. In one embodiment, the fourth mode includes both the first circuit and second circuit being non-operational. In addition, the supply fan is the only component activated while the exhaust fan is deactivated.

This mode can be preferred when ambient air is at a comfortable temperature and conditioning is not necessary or humidity is high so that conditioning is limited. The fans operate to draw air and create a draft without any cooling of said ambient air. The water pump is inactive and as such the heat rejection and cooling units are inactive. In this mode, the system does not cool incoming air. Rather, it circulates air and consumes less energy than other modes.

Control System

A control system contains the logic operation of the system and a series of input conditions and output requirements. The control system can include a control algorithm and input/output devices to operate the cooling apparatus. The control system can operate the cooling apparatus and target a comfortable apparent temperature level by using the most energy efficient operation mode. Additionally, the control algorithm can determine a preferred operational mode based on psychrometric conditions, including temperature and humidity.

FIG. 5 depicts a series of steps 300 involved in operating the evaporative cooling apparatus and its control system. A user can activate the apparatus 305 and enter preferred criteria through a user interface 310. The criteria can include a temperature, humidity, and fan speed preferences along with input related to energy use (e.g. econ vs. comfort). The system can also include sensors 320 to detect ambient temperature and humidity levels, water temperatures, and supply air temperature.

User criteria and data collected from the temperature sensors can be stored and analyzed in a computer or central processing unit. Logic and one or more algorithms 325 can be used to monitor components and the apparatus controls 330. The apparatus can take efforts to optimize the air temperature of the environment in a gathering area or passenger compartment. For example, the speed of the fan and operational mode can be adjusted to achieve a desired air or water temperature. In particular, water flow and volume can be adjusted with the pump, valves and/or flow restriction devices for operating the apparatus in one of the multiple modes.

The apparatus can balance economy with a user's desired temperature. An algorithm can analyze ambient conditions to the select the most energy efficient cooling mode for the apparatus to achieve a desired temperature. For example, the apparatus can be set to "Deep-cooling", "Dry-cooling", "Adiabatic cooling" or "Fan" mode in order to optimise the cooling capacity and airflow supply.

Accordingly, in one embodiment there is provided a method of conditioning air and/or water using the apparatus disclosed herein including the following steps of: activating the apparatus to direct ambient air therethrough; adjusting an operational mode to control the water flow and volume through the apparatus to provide variable cooling, whereby the operational mode includes four operational modes; and exhausting warm air and cool air out of the apparatus.

Examples

The compositions and methods described herein will be further understood by reference to the following examples, which are intended to be purely exemplary. The compositions and methods described herein are not limited in scope by the exemplified embodiments, which are intended as illustrations of single aspects only. Any methods that are functionally equivalent are within the scope of the invention. Various modifications of the compositions and methods described herein in addition to those expressly described herein will become apparent to those skilled in the art from the foregoing description and accompanying figures. Such modifications fall within the scope of the invention.

Use of the Evaporative Cooling System in a Residential Structure

The evaporative cooling apparatus can be used to condition air inside a residence. While cool air is directed into the residence, warm air from the heat rejection unit can be directed toward the exterior environment. In this example, a user enters desired criteria such as a target temperature into the system. Sensors monitor conditions inside a residence and automatically adjust the apparatus controls.

The user can activate the apparatus through a switch or user interface. Fans drive ambient air through the apparatus. Ambient air enters the apparatus and is cooled through adiabatic and sensible methods with cool air being directed out of the apparatus into a room or other area. Heat and moisture are exhausted into the exterior environment from the apparatus by a heat rejection unit and exhaust fan. The heat rejection unit expels heat from circulating water so that cool water can be re-circulated and fed back into the water management system. The evaporative cooling acts to chill water that circulates through the system. The combination of these conditioning stages provides for outlet supply temperatures to go below the pre-treatment wet bulb temperature without the use of a mechanical vapor compression system.

In particular, with reference to the exemplary embodiment of FIGS. 1A and 4A, air can be moved through the heat rejection unit using an exhaust fan where air and water heat exchange takes place. Water flowing through the evaporative media of the heat rejection unit has its heat removed when it is vaporized to gas. The resulting water that is cooled then flows into the first water reservoir and can subsequently flow into a second reservoir. The cold water stored in the second reservoir can then be pumped through the pre-cooler to sensibly cool the air (i.e. first stage of cooling). The water that is heated up as it passes through the pre-cooler can be immediately delivered to the evaporative media of the heat rejection unit to be re-cooled before returning to the second reservoir via the first reservoir. In the cooling unit the sensibly cooled air moving through the pre-cooler then flows through the evaporative media which can also have water separately flowed therethrough from the second reservoir (i.e. second stage of cooling). The cool air from the cooling unit can then be delivered to a target space using a supply fan.

Alternatively, with reference to the exemplary embodiment of FIGS. 1A and 4B, air can be moved through the heat rejection unit using an exhaust fan where air and water heat exchange takes place. Water flowing through the evaporative media of the heat rejection unit has its heat removed when it is vaporized to gas. The resulting water that is cooled then flows into the first water reservoir and can subsequently flow into the pre-cooler of the cooling unit to sensibly cool the air (i.e. first stage of cooling). The water that is heated up as it passes through the pre-cooler can be immediately delivered to the evaporative media of the heat rejection unit to be re-cooled before returning to the first reservoir. In the cooling unit the sensibly cooled air moving through the pre-cooler then flows through the evaporative media which can also have water separately flowed therethrough from the second reservoir (i.e. second stage of cooling). The cool air from the cooling unit can then be delivered to a target space using a supply fan.

The above operational embodiments of the apparatus disclosed herein are applicable in any configuration or positioning of the units with respect to one another.

Use of Dual Units to Condition Air in a Gathering Area

The evaporative cooling system can be used to condition air that is toward a gathering area. A gathering area or gathering place can be any place where people are able to congregate. Gathering places can be public; for example, city streets, town squares, and parks. They can also be private; for example, offices, residences, cafes, stadiums, and theaters (indoors or outdoors). The apparatus can direct cool air into the gathering area while warm air from the heat rejection unit is directed elsewhere. With reference to the exemplary embodiment of FIG. 1B, the heat rejection unit can be placed apart from the main cooling unit while still being fluidly connected through the water circuits. Thus, the units can be located at different locations (i.e. a first location and a second location). A user enters desired criteria such as a target temperature into the system. Sensors can monitor conditions inside a gathering area and adjust the system controls.

The user can activate the system through a switch or user interface 305 as depicted in FIG. 5. The user can also enter a desired temperature and/or humidity 310. Fans drive ambient air through the system. The heat rejection unit expels heat from circulating water and cool water is circulated back to the main cooling unit. Ambient air enters the system and is cooled with a pre-cooler that does not increase the humidity. Thereafter the air is further cooled through evaporative porous media. Cool air is directed out of the system into the gathering area. Heat and moisture is exhausted into the exterior environment from the system by a heat rejection unit.

Sensors can detect conditions of the environment, including ambient air temperature, ambient air humidity, water temperature, air pressure and supply air temperature 320. A control algorithm 325 can make adjustments to the operation and output of the system to maintain conditions based on the user's desired conditions. For example, adjustments can be made to fan levels, water pressure, water directional control and/or water volume.

A user can adjust the settings to alter the air flow or temperature output of the system. For example, the user may desire a lower output air temperature and activate Mode 1 (Deep Cooling Mode). Here, water flows through all of the components with all water circuits active.

In another example, the user desires a slightly higher volumetric output air flow without an increase in humidity from conditioned air. The user can activate Mode 2 (Dry Cooling Mode). The first water circuit to the heat rejection unit is active. The second water circuit is also activated and water flows through the pre-cooler only where it is cooled sensibly. The water does not flow through the evaporative porous media of the main cooling unit.

In another example, the user desires moderate air conditioning with an increase in humidity. The user can activate Mode 3 (Adiabatic Cooling Mode). Water flow is directed through only the evaporative media of the cooling unit.

The system can also operate in "fan mode." This mode can be preferred when ambient air is at a comfortable temperature and conditioning is not necessary or humidity is high so that conditioning is limited. The main fan operates to draw air and create a draft. The water pump is inactive and as such the heat rejection and main cooling units are inactive. In this mode, the system does not cool incoming air. Rather, it circulates air and consumes less energy than other modes.

In some embodiments, the apparatus reduces the temperature of ambient air in a gathering area by at least 1° C., at least 2° C., at least 3° C., at least 4° C., at least 5° C., at least 6° C., at least 7° C., at least 8° C., at least 9° C., at least 10° C., at least 11° C., at least 12° C. or more. In some embodiments, the apparatus does not change the temperature of air in a gathering area. In some embodiments, the apparatus reduces the temperature of circulating water by at least 1° C., at least 2° C., at least 3° C., at least 4° C., at least 5° C., at least 6° C., at least 7° C., at least 8° C., at least 9° C., at least 10° C., at least 11° C., at least 12° C. or more. In some embodiments, the apparatus does not lead to an increase in the relative humidity in a gathering area. In some embodiments, the apparatus increases the relative humidity of ambient air in a gathering area by at least 1%, at least 2%, at least 3%, at least 4%, at least 5%, at least 6%, at least 7%, at least 8%, at least 9%, at least 10%, at least 11%, at least 12%, at least 13%, at least 14%, at least 15% or more.

In some embodiments, the apparatus increases the relative humidity of ambient air in a gathering area by no more than 1%, no more than 2%, no more than 3%, no more than 4%, no more than 5%, no more than 6%, no more than 7%, no more than 8%, no more than 9%, no more than 10%, no more than 11%, no more than 12%, no more than 13%, no more than 14% or no more than 15%.

It will be appreciated that variations of the above disclosed and other features and functions, or alternatives thereof, may be combined into other systems or applications. Also, various unforeseen or unanticipated alternatives, modifications, variations or improvements therein may be subsequently made by those skilled in the art which are also intended to be encompassed by the following claims.

Although embodiments of the current disclosure have been described comprehensively, in considerable detail to cover the possible aspects, those skilled in the art would recognize that other versions of the disclosure are also possible.

What is claimed is:

1. An apparatus for cooling air and/or water, said apparatus comprising:
   a first reservoir for holding a first water volume;
   a second reservoir for holding a second water volume, wherein the first and second reservoir are in fluid communication with each other;
   a heat rejection unit comprising at least one evaporative media, wherein air entering the heat rejection unit first passes through the at least one evaporative media before being exhausted;
   a cooling unit comprising at least one evaporative media and at least one pre-cooler;
   a first water circuit fluidly connecting the at least one pre-cooler and the at least one evaporative media of the cooling unit, the heat rejection unit, the first reservoir and the second reservoir;
   a second water circuit fluidly connecting the at least one evaporative media of the cooling unit and the first reservoir and/or the second reservoir; and
   a means for adjusting the water flow rate and/or volume through the first and second water circuit,
   wherein the heat rejection unit and cooling unit are contained within separate housings, wherein each housing comprises one or more inlets for intake airflow and one or more outlets for exhaust airflow.

2. The apparatus of claim 1, wherein the first water volume is larger than the second water volume.

3. The apparatus of claim 1, wherein the first reservoir is positioned within the heat rejection unit.

4. The apparatus of claim 1, wherein the second reservoir is positioned within the cooling unit.

5. The apparatus of claim 1, wherein the first water circuit and second water circuit form a closed loop that circulates water from the first and second reservoir and back again for re-circulation through the apparatus.

6. The apparatus of claim 1, wherein the first water circuit is configured to direct water from the first reservoir or the second reservoir to
   a) the at least one pre-cooler,
   b) the at least one evaporative media of the heat rejection unit, and then to
   c) the first reservoir.

7. The apparatus of claim 1, wherein the second water circuit is configured to direct water from the first or second reservoir to the at least one evaporative media of the cooling unit and then to the second reservoir.

8. The apparatus of claim 1, wherein the apparatus is operable between four modes for variable cooling of the air and/or water.

9. The apparatus of claim 8, in which in a first mode both the first circuit and second circuit are operational to circulate water therethrough; in a second mode only the first circuit is operational to circulate water therethrough; in a third mode only the second circuit is operational to circulate water therethrough; and in a fourth mode both the first circuit and second circuit are not operational.

10. The apparatus of claim 1, further comprising a pump coupled to the first water circuit and the second water circuit.

11. The apparatus of claim 1, wherein the means for adjusting the water flow comprises a valve and/or a flow restriction device to adjust water circulating through the first and/or second water circuit.

12. The apparatus of claim 1, wherein the heat rejection unit surrounds a first central chamber.

13. The apparatus of claim 1, wherein the cooling unit surrounds a second central chamber.

14. The apparatus of claim 1, wherein the cooling unit is at a first location and the heat rejection unit is at a second location.

15. The apparatus of claim 1, wherein each of the cooling unit and heat rejection unit are coupled to a variable fan.

16. A method of conditioning air and/or water comprising the steps of:
   a. using an apparatus for cooling air and/or water, said apparatus comprising:
      a first reservoir for holding a first water volume;
      a second reservoir for holding a second water volume, wherein the first and second reservoir are in fluid communication with each other;
      a heat rejection unit comprising at least one evaporative media, wherein air entering the heat rejection unit first passes through the at least one evaporative media before being exhausted;
      a cooling unit comprising at least one evaporative media and at least one pre-cooler;
      a first water circuit fluidly connecting the at least one pre-cooler and the at least one evaporative media of the cooling unit, the heat rejection unit, the first reservoir and the second reservoir;
      a second water circuit fluidly connecting the at least one evaporative media of the cooling unit and the first reservoir and/or the second reservoir; and
      a means for adjusting the water flow rate and/or volume through the first and second water circuit,
      wherein the heat rejection unit and cooling unit are contained within separate housings, wherein each housing comprises one or more inlets for intake airflow and one or more outlets for exhaust airflow;
   b. activating the apparatus to direct ambient air therethrough;
   c. adjusting an operational mode to control the water flow and volume through the apparatus to provide variable cooling, whereby the operational mode includes four operational modes; and
   d. exhausting warm air and cool air out of the apparatus.

17. The method of claim 16, wherein the water flow and/or volume of at least one of the first water reservoir, the heat rejection unit, the second water reservoir, the pre-cooler in the cooling unit and the evaporative media in the cooling unit is adjusted.

18. The method of claim 17, wherein the water flow is adjusted to "deep cooling mode" so that water flows through all circuits.

19. The method of claim 17, wherein the water flow is adjusted to "dry cooling mode" so that water flows through the pre-cooler in the cooling unit and then through the heat rejection unit.

20. The method of claim 17, wherein the water flow is adjusted to "adiabatic cooling mode" so that water flows through an evaporative media in the cooling unit.

21. The method of claim 17, wherein the water flow is adjusted to "fan mode" with an absence of water flow through either circuit.

22. The method of claim 16, further comprising a step of adjusting water flow based on desired temperature and/or humidity of the conditioned air.

23. The method of claim 16, further comprising a step of expelling air from the heat rejection unit away from the gathering area.

24. The method of claim 16, further comprising a step of adjusting air flow with one or more variable flow flans.

* * * * *